United States Patent
Cook et al.

(10) Patent No.: US 11,708,818 B1
(45) Date of Patent: Jul. 25, 2023

(54) SYSTEMS FOR GENERATING ENERGY FROM GEOTHERMAL SOURCES AND METHODS OF OPERATING AND CONSTRUCTING SAME

(71) Applicant: Roda Energy Corporation, Calgary (CA)

(72) Inventors: Curtis Cook, Calgary (CA); Neal Gartner, Calgary (CA); Shane Engelking, Cochrane (CA); Jeff Peterson, Calgary (CA)

(73) Assignee: Roda Energy Corporation, Calgary (CA)

( * ) Notice: Subject to any disclaimer, the term of this patent is extended or adjusted under 35 U.S.C. 154(b) by 0 days.

(21) Appl. No.: 17/966,969

(22) Filed: Oct. 17, 2022

(51) Int. Cl.
*F24T 10/30* (2018.01)
*F03G 4/02* (2006.01)
(Continued)

(52) U.S. Cl.
CPC ............... *F03G 4/02* (2021.08); *F03G 4/045* (2021.08); *F03G 4/072* (2021.08); *F24T 10/30* (2018.05); *F24T 50/00* (2018.05)

(58) Field of Classification Search
CPC . F24T 10/30; F24T 50/00; F24T 10/13; F03G 4/045; F03G 4/072; F03G 4/02;
(Continued)

(56) References Cited

U.S. PATENT DOCUMENTS 6,247,313 B1 6/2001 Moe et al.
11,125,472 B2 9/2021 Toews et al.
(Continued)

FOREIGN PATENT DOCUMENTS

CA 2998782 10/2018
CA 3013374 4/2019
(Continued)

OTHER PUBLICATIONS

"EavorTM", Web page <https://www.eavor.com/>, Retrieved on Nov. 13, 2022.
(Continued)

*Primary Examiner* — Shafiq Mian
(74) *Attorney, Agent, or Firm* — Forsgren Fisher McCalmont DeMarea Tysver LLP; James M. Urzedowski; Daniel A. Tysver

(57) ABSTRACT

The present disclosure describes a system and a method for generating energy from geothermal sources. The system includes an injection well and a production well extending underground into a rock formation, a first lateral section connected to the injection well and a second lateral section connected to the production well, the first and second lateral sections connected with a multilateral connector, defining a pressure-tested downhole well loop within the rock formation and in a heat transfer arrangement therewith. The downhole well loop cased in steel and cemented in place within the rock formation. The downhole well loop to receive working fluid capable of undergoing phase change between liquid and gas within the downhole well loop as a result of heat transferred from the rock formation. The system also includes a pump to circulate working fluid, a turbine system to convert the flow of working fluid into electricity, and a cooler.

53 Claims, 16 Drawing Sheets

(51) Int. Cl.
*F03G 4/00* (2006.01)
*F24T 50/00* (2018.01)

(58) Field of Classification Search
CPC ....... Y02E 10/00; Y02E 10/125; Y02E 10/10; Y02E 10/14; F03J 3/08
See application file for complete search history.

(56) References Cited

U.S. PATENT DOCUMENTS

| | | | |
|---|---|---|---|
| 11,156,386 B2 | 10/2021 | Cairns et al. | |
| 11,242,726 B2 | 2/2022 | Toews et al. | |
| 2011/0048005 A1 | 3/2011 | McHargue | |
| 2012/0174581 A1* | 7/2012 | Vaughan | F24T 10/10 290/40 C |
| 2017/0211849 A1* | 7/2017 | Muir | F03G 7/04 |
| 2018/0283735 A1* | 10/2018 | Song | E21B 43/305 |
| 2018/0291880 A1 | 10/2018 | Cairns et al. | |
| 2019/0128567 A1 | 5/2019 | Redfern | |
| 2019/0154010 A1 | 5/2019 | Toews | |
| 2019/0346181 A1* | 11/2019 | Toews | F24T 10/40 |
| 2020/0408041 A1 | 12/2020 | Riddell et al. | |
| 2021/0003320 A1 | 1/2021 | Toews et al. | |
| 2021/0164327 A1 | 6/2021 | Toews et al. | |
| 2021/0231109 A1 | 7/2021 | Toews et al. | |
| 2021/0325089 A1 | 10/2021 | Toews et al. | |
| 2022/0003459 A1 | 1/2022 | Toews et al. | |
| 2022/0026112 A1 | 1/2022 | Cairns et al. | |

FOREIGN PATENT DOCUMENTS

| | | |
|---|---|---|
| CA | 3041002 | 5/2019 |
| CA | 3038294 | 6/2019 |
| CA | 3044153 | 1/2020 |
| CA | 3050274 | 2/2020 |
| CA | 3083568 | 12/2020 |
| CA | 3083575 | 12/2020 |
| CA | 3144627 | 12/2020 |
| CA | 3085901 | 2/2021 |
| CA | 3098406 | 2/2021 |
| CA | 3138740 | 2/2021 |
| CA | 3097436 | 5/2021 |
| CA | 3100013 | 8/2021 |
| WO | WO2022011444 | 1/2022 |
| WO | WO2022018674 | 1/2022 |
| WO | WO2022029699 | 2/2022 |
| WO | WO2022043947 | 3/2022 |

OTHER PUBLICATIONS

"EavorTM Technology", Web page <https://www.eavor.com/technology/>, Retrieved on Nov. 13, 2022.

"EavorTM Eavor-LiteTM", Web page <https://www.eavor.com/eavor-lite/>, Retrieved on Nov. 13, 2022.

* cited by examiner

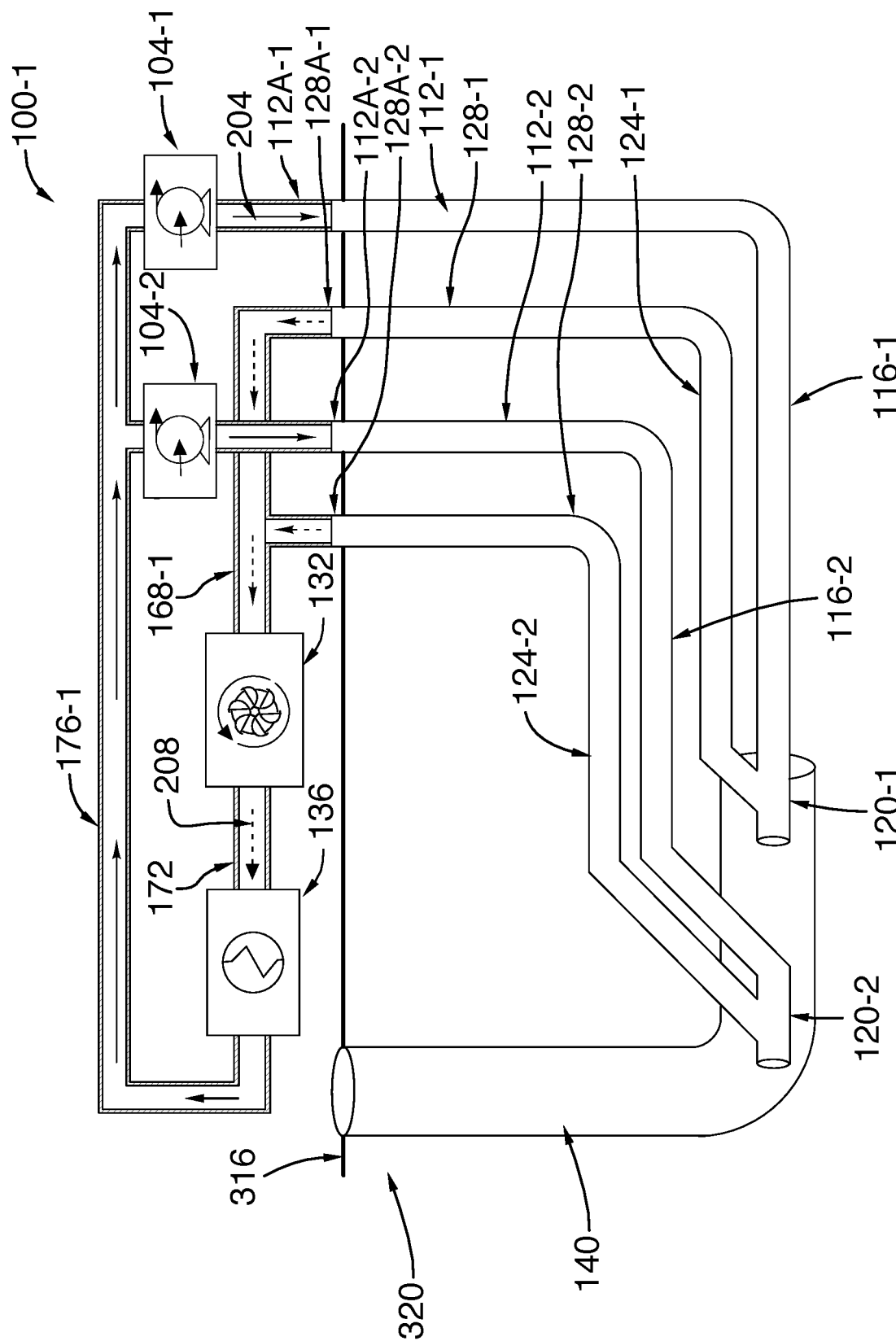

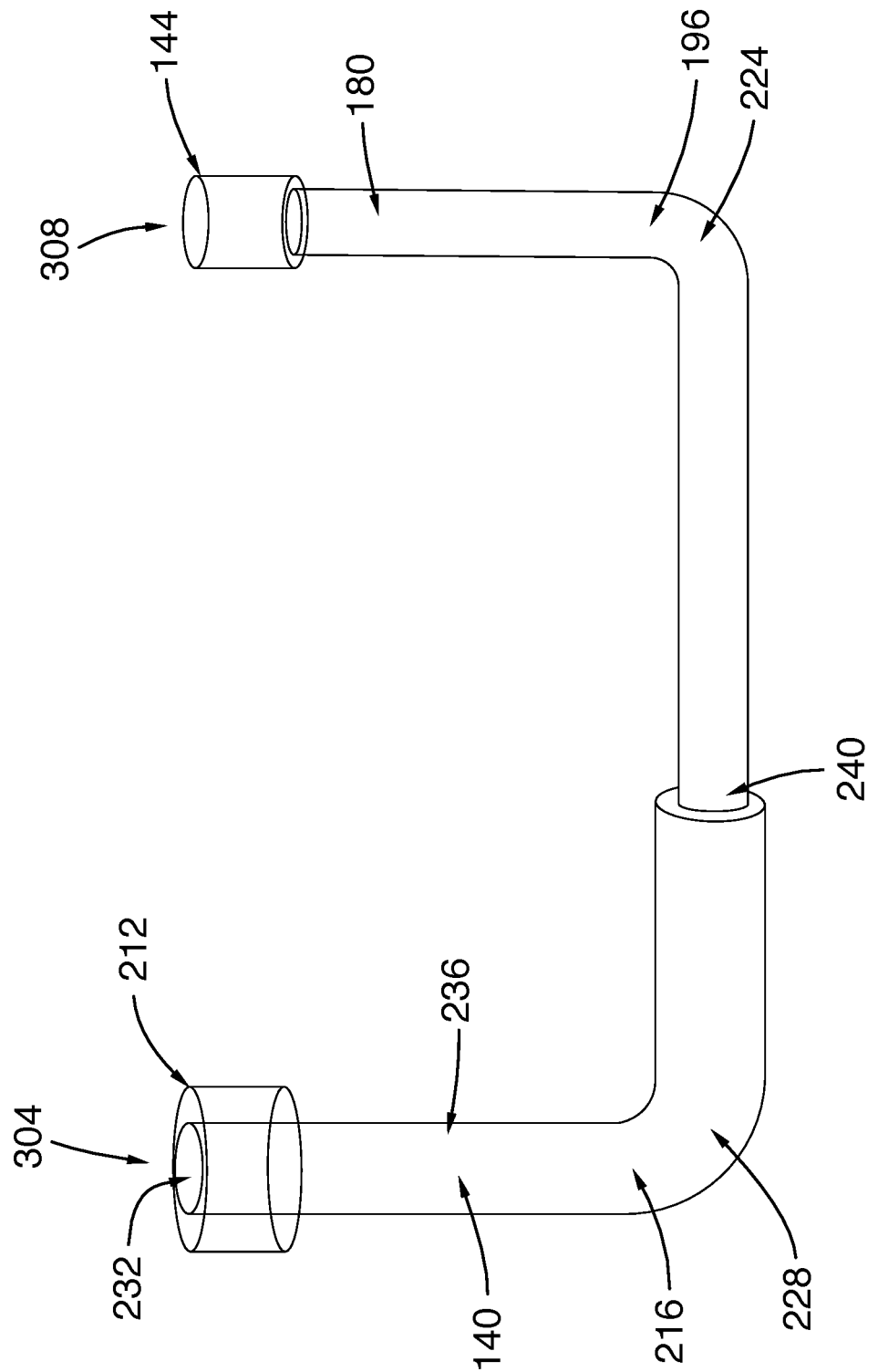

SYSTEMS FOR GENERATING ENERGY FROM GEOTHERMAL SOURCES AND METHODS OF OPERATING AND CONSTRUCTING SAME

FIELD OF INVENTION

The present disclosure relates generally to generating energy from geothermal sources and more specifically to systems for generating energy from geothermal sources and methods of operating and constructing same.

BACKGROUND OF THE INVENTION

Systems for energy generation from geothermal sources (also referred to herein as geothermal energy generation systems) are designed such that working fluids or water are circulated underground to be heated, and then the heat energy is brought back up to the surface to be converted into electricity. The working fluid or water is then cooled and returned underground to the heat source.

In some known geothermal energy generation systems, the working fluid that flows underground is exposed to the rock formations underground, allowing the first working fluid to pick up debris, rocks, and other solids as it flows underground. The picking up of debris, rocks, and other solids may cause issues with any equipment with moving parts, such as pumps that are required to help circulate the working fluid, or turbines which are used to generate electricity from the heat energy from the working fluid when returning to the surface.

One method of solving this is to provide filters along the flow path of the working fluid, or prior to the working fluid entering any machinery. The filters may help mitigate the working fluid from carrying debris or solids into any machinery. However, filters need to be changed, and hence increase maintenance cost. Furthermore, filters are an added component, and as such, lead to another potential point of failure in the system.

Another method of solving the issue of debris in the working fluid is to use a binary cycle power station, where two working fluids are used, where a first working fluid is heated underground, and then is passed by an isolated secondary working fluid in a second loop, where the second working fluid is heated and is used to power turbines. While this may save the turbines from encountering debris, the pumps required to circulate the first working fluid underground still need to contend with the debris. In addition, binary cycle power stations are not efficient, as they have a high parasitic load, and a significant amount of heat may be loss when transferring heat from the first working fluid to the second working fluid.

Furthermore, the working fluid that loops underground may also begin eroding away at the rock surfaces along the path of the flow of the working fluid. The erosion of the rock surfaces may lead to unstable pathways underground, and may also lead to the damage of the environment. As such, to prevent erosion, the flow rates of the working fluid must be minimized to protect the integrity of the rock formations. This will lead to addition residence time underground for the working fluid.

As the working fluid flows underground, it may also leak into the surrounding environment through gaps in the rock formations underground, causing underground pollution. As such, in order to be environmentally friendly, the working fluid needs to be an environmentally friendly fluid such as water. Even so, if the first working fluid picks up any non-environmentally friendly substances along it's path flow, such as picking up oil while flowing through a pump, this may still be leaked into the external environment.

In other known geothermal energy systems, to prevent erosion, environmental leakage and to prevent the inclusion of debris in the working fluid along the loop underground, a chemical layer, a chemically treated layer, or a polymer coating layer is provided, where the polymer coating is applied to and seals the rock formation from the circulating fluid. However, some inherent shortcomings with a polymer coating layer include the polymer coated loop underground not being able to be pressure tested. Without pressure testing the underground loop, there is no assurance as to whether the polymer coating layer will hold at depths where the working fluid is subjected to high pressures and whether the polymer coating layer will react with different working fluids, and as such, there may be leaks including underground pollution.

Furthermore, a polymer coating itself is subject to erosion, and once eroded may allow for erosion of the rock formation. This leads to contamination of the first working fluid. To prevent this, the polymer coating may need to be applied in several layers, and may also need to be continually replaced, leading to high maintenance costs, additional downtime, and loss of production time. Even after applying the polymer coating, it is difficult to verify that the entire rock formation and pathway/loop of the first working fluid has been coated, much less ensuring the thickness or integrity of the polymer coating.

In other prior art, such as U.S. Patent Application Publication No. 2018/0291880 and International Patent Application Publication No. WO 2022029699 a casing is provided, however, this casing is not cemented, which may lead to instability. In addition, this casing is not pressure tested, which may lead to instabilities at depths with high pressures or with working fluids with either high or varied flowrates underground. The instabilities may result in poor operating performance as well as potentially underground pollution, should a working fluid that is not water leak, such as is provided in both of the aforementioned patent application publications, where two working fluids are used. Underground pollution may occur through leakage of the working fluids into gaps in the rock formation. The gaps in the rock formation may be unknown fractures that were previously present, or may be fractures that were induced through drilling during the construction of the geothermal energy generation system. If there is any leakage of working fluid, the fluid may be transported through the fractures, and into sensitive resources, such as the ground water.

In other prior art, such as U.S. Patent Application Publication No. 2011/0048005, a continuous string of pipe is cemented within and throughout the length of two connected wellbores, specifically from an injection wellhead of one borehole, underground to a subterranean nearly horizontal pipeline, and back up an ascending well to a production wellhead. This allows for a working fluid to be transported underground, undergo a phase change due to the heat from the surrounding subterranean rock, and then transported back to the surface to be used in the power plant. There is only a single subterranean horizontal pipeline linking between the injection wellhead and production wellhead. In this type of system, the single subterranean horizontal pipeline and the distance between the injection wellhead and production wellhead tends to be quite long in order to effect sufficient heat transfer between the rock formation and the production fluid. This large distance between the injection wellhead and production wellhead tends to create a large footprint both above ground and below ground. This increases the cost of the system overall, as there is additional length of piping required above ground between the injection wellhead and the production wellhead, additional volumes of working fluid for the additional lengths of piping above ground, and also heat may be lost due to the additional time that the production fluid is spent above ground, potentially increasing parasitic load. Furthermore, the construction technique provided in U.S. Patent Application Publication No. 2011/0048005 does not allow for a pressurized connection between two sections.

As such, it would be advantageous to have a solution where the geothermal energy generation system may have an underground loop that includes a barrier that may be pressure tested, and one where the risk of erosion, inclusion of debris and leakage into the surrounding rock formations and environment are at a minimal. In addition, it would also be beneficial to have a solution where maintenance is minimal, saving costs and minimizing downtime, and where there are fewer points of failure within the system.

SUMMARY OF INVENTION

According to various aspects of the present invention, there is provided a system for generating energy from geothermal sources. The system includes an injection well extending underground into a rock formation, the injection well having an upper end and a lower end. The system also includes a production well extending underground into the rock formation in proximity to the injection well, the production well having an upper end and lower end. Furthermore, the system includes a first lateral section connected to and extending away from a location along the injection well and a second lateral section connected to and extending away from a location along the production well, where the first and second lateral sections are connected with a multilateral connector, each of the first and second lateral sections having a length that is greater than the distance between the upper ends of the injection well and the production well. Each of the injection well, the production well, the first and second lateral sections being cased in steel and cemented in place within the rock formation. The injection well, the first lateral section, the multilateral connector, the second lateral section and the production well cooperating with each other to define a pressure-tested downhole well loop within the rock formation and in a heat transfer arrangement therewith, the pressure-tested downhole well loop being configured to receive a working fluid capable of undergoing phase change between liquid and gas within the pressure-tested downhole well loop as a result of heat transferred from the rock formation. The system also includes a pump fluidly connected to the injection well, the pump being configured to circulate the working fluid through the pressure-tested downhole well loop. In addition, the system includes a turbine system fluidly connected to the production well, the turbine system being operable to convert mechanical energy generated from the flow of working fluid, into electricity. The system further includes a cooler fluidly connected between the pump and the turbine system for cooling the working fluid.

The system may further include an injection well surface casing surrounding an inlet of the injection well, where the injection well surface casing is partially above the surface and being configured to prevent the escape of the working fluid into the rock formation.

The system may further include a production well surface casing surrounding an outlet of the production well, the production well surface casing partially above the surface and being configured to prevent the escape of the working fluid into the rock formation.

The injection well includes an inlet, and the production well includes an outlet, the inlet and the outlet being located on the surface in proximity to each other, the inlet being at a distance between 7 m and 50 m from the outlet.

The system may have an above ground surface area of 22500 $m^2$.

The working fluid may be a homogeneous working fluid.

Alternatively, the working fluid may be a heterogenous working fluid.

The injection well may have a depth of between 1000 m and 4000 m.

The first lateral section may have a length of between 2000 m to 4000 m.

The second lateral section may have a length of between 2000 m to 4000 m.

The production well may have a depth of between 1000 m to 4000 m.

The first lateral section may be longer than the second lateral section, and wherein the first lateral section is at a lower depth than that of the second lateral section.

The first lateral section may be at the same depth as the second lateral section, the first lateral section extending away from the lower end of the injection well at a first angle, and the second lateral section extending away from the lower end of the production well at a second angle.

In operation the pressure-tested downhole well loop may be configured to receive fluids pressurized between 7 MPa and 31 MPa.

The pressure-tested downhole well loop may be capable to withstand pressures of at least 7 MPa.

The pump may be a positive displacement type pump with a variable speed drive controller.

In addition, the positive displacement type pump may be selected from the group consisting of plunger type pumps, gear type pumps and rotary vane type pumps.

The turbine system may include a turbine expander.

The turbine system may be capable of generating between 0.5 to 2 MW of output power.

The cooler may be using ambient air as a coolant.

The system may further include a storage tank, the storage tank connected between the cooler and the pump, and being configured to hold the excess working fluid.

The working fluid may be selected from the group consisting of a refrigerant, a hydrocarbon-based fluid, ammonia, carbon dioxide, and water.

In addition, if the working fluid is a hydrocarbon-based working fluid, the hydrocarbon-based working fluid is selected from the group consisting of propane, ethane, pentane, butane, and hydrocarbon blend.

Alternatively, the working fluid is propane.

The system may further include a recuperator with a first flow through connected between the turbine system and the cooler, and a second flow through connected between the pump and the injection well, the recuperator being configured to transfer heat from the first flow through to the second flow through.

Furthermore, the system may include an access well having a lateral segment, wherein the multilateral connector is positioned within the lateral segment of the access well.

The system may also include, wherein the injection well is a first injection well, the production well is a first production well, the multilateral connector is a first multilateral connector, the pressure-tested downhole well loop is a first pressure-tested downhole well loop and the pump is a first pump, a second injection well extending underground into the rock formation, the second injection well having an upper end and a lower end. In addition, the system may also include a second production well extending underground into the rock formation in proximity to the second injection well, the second production well having an upper end and lower end. Furthermore, the system may include a third lateral section connected to and extending away from a location along the second injection well, and a fourth lateral section connected to and extending away from a location along the second production well, where the third and fourth lateral sections connected with a second multilateral connector, each of the third and fourth lateral sections having a length that is greater than the distance between the upper ends of the second injection well and the second production well. In addition, each of the second injection well, the second production well, the third and fourth lateral sections being cased in steel and cemented in place within the rock formation. The second injection well, the third lateral section, the second multilateral connector, the fourth lateral section and the second production well cooperating with each other to define a second pressure-tested downhole well loop within the rock formation and in a heat transfer arrangement therewith, the second pressure-tested downhole well loop being configured to receive the working fluid capable of undergoing phase change between liquid and gas within the second pressure-tested downhole well loop as a result of heat transferred from the rock formation. The system may also include a second pump fluidly connected to the second injection well, the second pump being configured to circulate the working fluid through the second pressure-tested downhole well loop. In addition, the system may include the second production well fluidly connected to the turbine system, the turbine system being configured to receive the working fluid from the first production well of the first pressure-tested downhole well loop and the second production well of the second pressure-tested downhole well loop. The cooler may be fluidly connected to both the first pump connected to the first injection well, and the second pump connected to the second injection well, and the second multilateral connector of the second pressure-tested downhole well loop being positioned within the lateral segment of the access well at a location spaced apart from the first multilateral connector.

In addition, the first injection well includes a first inlet, the first production well includes a first outlet, the second injection well includes a second inlet, and the second production well includes a second outlet, the second inlet and the second outlet being located on the surface in proximity to each other, the second inlet being at a distance between 7 m and 50 m from the second outlet.

Furthermore, the first inlet and the second inlet may be located on the surface in proximity to each other, the first inlet being at least a distance of 20 m from the second inlet.

In addition, the first outlet and the second outlet may be located on the surface in proximity to each other, the first outlet being at least a distance of 20 m from the second outlet.

The system may further have an above ground surface area of 45000 m².

According to various aspects of the present invention, there is provided a method of generating energy from geothermal sources. The method including providing a pressure-tested downhole well loop extending underground into a rock formation, the pressure-tested downhole well loop including an injection well, a production well in proximity to the injection well, a first lateral section connected to the injection well, a second lateral section connected to the production well, a multilateral connector connecting the first lateral section and the second lateral section, where each of the injection well, the production well, the first and second lateral sections being cased in steel and cemented in place within the rock formation, the first and second lateral sections having a length that is greater than the distance on the surface between the injection well and the production well. The method includes conveying a working fluid through the pressure-tested downhole well loop, the working fluid being received by the injection well in a liquid state. While conveying the working fluid through the pressure-tested downhole well loop, transferring heat from the surrounding rock formations to the liquid working fluid and exerting pressure on the liquid working fluid. The method further includes inducing a phase change in the working fluid from a liquid state to a gaseous state, the working fluid exiting the production well in a gaseous state. In addition, the method includes converting the mechanical energy generated from the flow of the gaseous working fluid, into electricity. The method also includes cooling the working fluid and inducing a phase change in the working fluid to a liquid state, and returning the working fluid to the injection well.

Conveying the working fluid through the pressure-tested downhole well loop may include pumping the working fluid.

Exerting pressure on the liquid working fluid may include exerting between 7 MPa and 31 MPa on the liquid working fluid.

The step of converting the mechanical energy generated from the flow of the gaseous working fluid into electricity may generate between 0.5 to 2 MW of output power.

The step of cooling the working fluid and inducing a phase change in the working fluid may be cooled using a cooler.

The method may include storing excess working fluid in a storage tank.

The working fluid may be a homogenous working fluid.

Alternatively, the working fluid may be a heterogenous working fluid.

The working fluid may be selected from the group consisting of a refrigerant, a carbon-based fluid, ammonia, carbon dioxide, and water.

If the working fluid is a hydrocarbon-based working fluid, the hydrocarbon-based working fluid may be selected from the group consisting of propane, ethane, pentane, butane, and hydrocarbon blend.

Alternatively, the working fluid is propane.

Where the working fluid is propane, the propane may be received by the injection well having a temperature of between 10° C. and 40° C. and a pressure of between 1000 kPag and 2000 kPag.

Alternatively, the propane may be received by the injection well having a temperature of 20° C. and a pressure of 1300 kPag.

Where the working fluid is propane, the step of inducing a phase change in the propane from a liquid state to a gaseous state may occur when the propane reaches a temperature of 140° C. and a pressure of 6250 kPag.

In addition, inducing a phase change in the propane from a liquid state to a gaseous state may occur in one of the second lateral section and the production well.

The propane exiting the production well in a gaseous state may have a temperature of between 90° C. and 110° C. and a pressure of between 3000 kPag and 4000 kPag.

Alternatively, the propane exiting the production well in a gaseous state may have a temperature of 106° C. and a pressure of 3500 kPag.

While conveying the working fluid through the pressure-tested downhole well loop, the temperature of the propane may increase by 76° C. and the pressure of the propane may increase by 2170 kPag.

After converting the mechanical energy generated from the flow of the gaseous working fluid into electricity, the propane may have a temperature of between 16° C. and 63° C. and a pressure of between 700 kPag and 1500 kPag.

Cooling the working fluid may cool the propane to a temperature of 30° C. and a pressure of 1080 kPag.

The method may include transferring heat from the working fluid in a first region to the working fluid in a second region using a recuperator, the working fluid in the first region occurring between the steps of converting the mechanical energy generated from the flow of the gaseous working fluid and cooling the working fluid, the working fluid in the second region occurring between the steps of conveying the working fluid through the pressure-tested downhole well loop and the working fluid being received by the injection well in the liquid state.

According to various aspects of the present invention, there is provided a method of constructing a pressure-tested downhole well loop for a system for generating energy from geothermal sources, the pressure-tested downhole well loop being configured to transfer heat from the surrounding rock formations to a working fluid flowing within the pressure-tested downhole well loop, and induce a phase change on the working fluid from a liquid state to a gaseous state. The method includes providing an access well extending underground into a rock formation, and drilling an injection well into the underground rock formation, the injection well spaced apart from the access well. The method further includes drilling a first lateral section extending away from the injection well and connecting to the access well and installing a first steel casing for the injection well and the first lateral section. In addition, the method includes cementing the first steel casing for the injection well and the first lateral section in place within the rock formation and drilling a production well into the underground rock formation, the production well in proximity to the injection well. The method also includes drilling a second lateral section extending away from the production well towards a connecting point between the first lateral section and the second lateral section, the connecting point located along the access well adjacent to the first lateral section and installing a second steel casing for the production well and the second lateral section. Furthermore, the method includes providing a multilateral connector through the access well and installing the multilateral connector at the connecting point between the first and second lateral sections and pressure testing the downhole well loop, the downhole well loop including the injection well, the first lateral section, the multilateral connector, the second lateral section, and the production well, the first and second lateral sections having a length that is greater than the distance on the surface between the injection well and the production well. The method also includes cementing the second steel casing for the production well and the second lateral section to the rock formation.

The method may also include drilling a hole for an injection well surface casing prior to drilling the injection well and setting in place the injection well surface casing.

Cementing the first casing for the injection well and the first lateral section in place within the rock formation may include drilling a bridging hole at an intersection point between the first lateral section and the second lateral section, and drilling the second lateral section may include connecting the second lateral section to the bridging hole.

The method may also include installing a first isolation packer and a first cementing stage tool prior to cementing the first casing for the injection well and the first lateral section in place within the rock formation, the first isolation packer and the first cementing stage tool installed in proximity to the intersection point between the first lateral section and the access well, the first isolation packer installed around an outer diameter of the first casing, and the first cementing stage tool installed within and blocking an inner diameter of the first casing.

Drilling the second lateral section extending away from the production well towards the connecting point may include installing a whipstock within the first lateral section in proximity to the connection point.

The method may further include drilling a hole for a production well surface casing prior to drilling the production well and setting in place the production well surface casing.

Pressuring testing the downhole well loop may include subjecting the downhole well loop to the pressure at the greatest depth within downhole well loop.

The method may include installing a second isolation packer and a second cementing stage tool prior to cementing the second casing for the production well and the second lateral section in place within the rock formation, the second isolation packer and the second cementing stage tool installed in proximity to the intersection point between the second lateral section and the multilateral connector, the second isolation packer installed around the outer diameter of the second casing, and the second cementing stage tool installed within and blocking the inner diameter of the second casing.

According to various aspects of the present invention, there is provided a system for generating energy from geothermal sources. The system includes a first injection well and a second injection well extending underground into a rock formation, each of the first and second injection well having an upper end and a lower end. The system includes a first production well and a second production well extending underground into the rock formation, each of the first and second production well in proximity to both the first and second injection well, each of the first and second production well having an upper end and lower end. The system also includes a first lateral section connected to and extending away from a location along the first injection well, a second lateral section connected to and extending away from a location along the first production well, a third lateral section connected and extending away from a location along the second injection well, and a fourth lateral section connected to and extending away from a location along the second production well. The first and second lateral sections connected with a first multilateral connector, each of the first and second lateral sections having a length that is greater than the distance between the upper ends of the first injection well and the first production well, and the third and fourth lateral sections connected with a second multilateral connector, each of the third and fourth lateral sections having a length that is greater than the distance between the upper ends of the second injection well and the second production well. In addition, each of the first and second injection wells, the first and second production wells, the first, second, third and fourth lateral sections being cased in steel and cemented in place within the rock formation. The system also includes the first injection well, the first lateral section, the first multilateral connector, the second lateral section and the first production well cooperating with each other to define a first pressure-tested downhole well loop within the rock formation, the second injection well, the third lateral section, the second multilateral connector, the fourth lateral section and the second production well cooperating with each other to define a second pressure-tested downhole well loop within the rock formation, being in a heat transfer arrangement with the rock formation each of the first and the second pressure-tested downhole well loop being configured to receive a working fluid capable of undergoing phase change between liquid and gas as a result of heat transferred from the rock formation. The system further includes a first pump fluidly connected to the first injection well, the first pump being configured to circulate the working fluid through the first pressure-tested downhole well loop, and a second pump fluidly connected to the second injection well, the second pump being configured to circulate the working fluid through the second pressure-tested downhole well loop. The system also includes a turbine system fluidly connected to the first and second production wells, the turbine system being operable to convert mechanical energy generated from the flow of working fluid, into electricity. Furthermore, the system includes a cooler fluidly connected between the first and second pumps and the turbine system, the cooler being operable to cool the working fluid received from the turbine system and to provide the cooled working fluid to both the first and second pumps, and where the first and second pressure-tested downhole well loop located in proximity to each other.

According to various aspects of the present invention, there is provided a system for generating energy from geothermal sources. The system includes an injection well extending underground into a rock formation, the injection well having an upper end and a lower end. The system also includes a production well extending underground into the rock formation in proximity to the injection well, the production well having an upper end and lower end. The system further includes a first lateral section connected to and extending away from a location along the injection well, and a second lateral section connected to and extending away from a location along the production well. The first and second lateral sections are connected with a multilateral connector. Each of the injection well, the production well, the first and second lateral sections being cased in steel and cemented in place within the rock formation. The system also includes the injection well, the first lateral section, the multilateral connector, the second lateral section and the production well cooperating with each other to define a pressure-tested downhole well loop within the rock formation and in a heat transfer arrangement therewith, the pressure-tested downhole well loop being configured to withstand a pressure of at least 7 MPa and receive a working fluid capable of undergoing phase change between liquid and gas within the pressure-tested downhole well loop as a result of heat transferred from the rock formation. The system also includes a pump fluidly connected to the injection well, the pump being configured to circulate the working fluid through the pressure-tested downhole well loop. Furthermore, the system includes a turbine system fluidly connected to the production well, the turbine system being operable to convert mechanical energy generated from the flow of working fluid, into electricity, and a cooler fluidly connected between the pump and the turbine system for cooling the working fluid.

BRIEF DESCRIPTION OF THE SEVERAL VIEWS OF THE DRAWINGS

The embodiments of the present invention shall be more clearly understood with reference to the following detailed description of the embodiments of the invention taken in conjunction with the accompanying drawings, in which:

FIG. 6A is a schematic cross-sectional view showing an alternate embodiment of a system for generating energy from geothermal sources with two fully cased downhole well loops connected to a single access well in accordance with an embodiment;

FIG. 7 is a schematic cross-sectional view depicting an initial step of constructing the system for generating energy from geothermal sources shown in FIG. 1, showing the drilling of the injection well, a construction well and a first lateral connecting section;

DESCRIPTION OF THE PREFERRED EMBODIMENTS OF THE INVENTION

Figure 1:
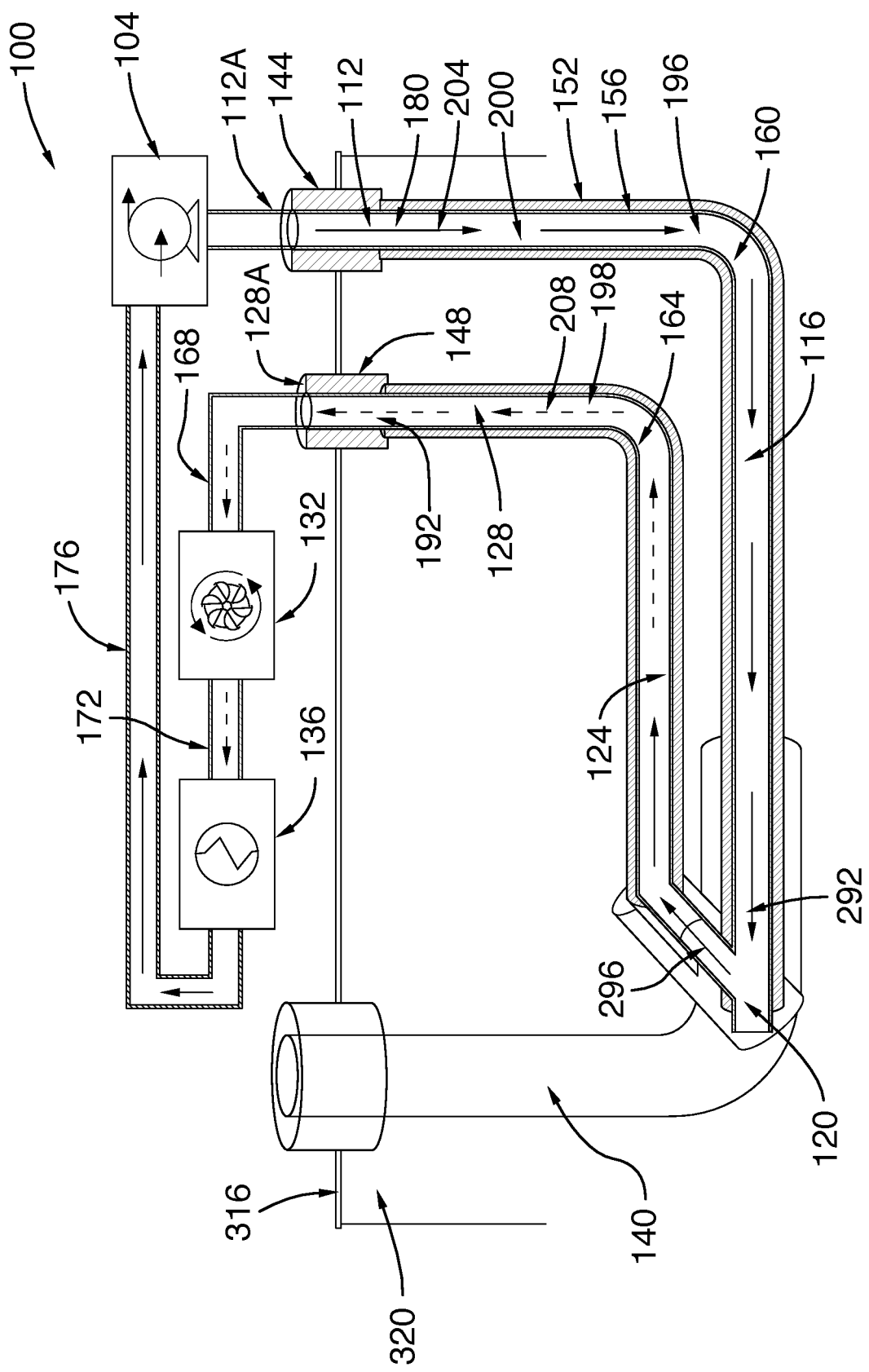
FIG. 1 is a schematic cross-sectional view showing a system for generating energy from geothermal sources in accordance with an embodiment.

The description, which follows, and the embodiments described therein are provided by way of illustration of an example, or examples of particular embodiments of principles and aspects of the present invention. These examples are provided for the purposes of explanation and not of limitation, of those principles of the invention. In the description that follows, like parts are marked throughout the specification and the drawings with the same respective reference numerals.

By way of general overview, there is provided a system for generating energy from geothermal sources 100 (also referred to herein as a geothermal energy generation system 100) with single heat exchange loop, where the system 100 includes a fully cased, pressure tested and cemented downhole well loop 108 (also referred to herein as a fully cased downhole well loop 108) for isolating and circulating a single fluid 200 (also referred to as a working fluid 200) over an extended length underground to achieve heat exchange between the working fluid 200 and heat emanating/radiating from the earth (i.e. the underground heat source). The system 100 employs a Rankine cycle (preferably, an organic Rankine cycle) to convert the energy stored in the heated working fluid 200 into mechanical energy which is then used to generate electrical power.

A person skilled in the art will recognize that in a Rankine cycle, working fluid 200 may undergo phase changes. For clarity, in the description below, working fluid 200 will be generally referred to regardless of the state of matter. Working fluid 200 in a liquid state will be referred to as liquid working fluid 204, and working fluid 200 in a gaseous state will be referred to as gaseous working fluid 208.

The geothermal energy generating system 100 includes, below ground, the fully cased downhole well loop 108 in the nature of a vertical injection well 112 extending into the ground; a first lower lateral section 116 connected to, and extending away from, the vertical injection well 112; and a vertical production well 128 extending into the ground; and a second upper lateral section 124 connected to, and extending away from, the vertical production well 128. The first and second lateral sections 116, 124 meet at a juncture where a multilateral connector 120 is installed. Above ground, the geothermal energy generating system 100 includes a pump 104 fluidly connected to the injection well 112, that is configured to move the liquid working fluid 204 down the injection well 112 away from the surface 316, through the first lower lateral section 116, the multilateral connector 120 and the second upper lateral section 124, and then up the production well 128 back towards the surface 316. The liquid working fluid 204 undergoes a phase change while underground, and returns to the surface 316 through the production well 128 as a gaseous working fluid 208 where it flows into a turbine system 132 for power generation. Within the turbine system 132 the gaseous working fluid 208 spins a turbine that then rotates a shaft and, creating mechanical energy. This mechanical energy is converted to electricity by a shaft driven power generator (not shown). Also provided, is a cooler 136 that is fluidly connected to the turbine system 132. The cooler 136 condenses the low pressure gaseous working fluid 208 after it leaves the turbine system 132, returning it to its original liquid state wherein it may be pumped down the injection well 112 and circulated through the fully cased downhole well loop 108.

As will be appreciated by a person skilled in the art and apparent from the description that follows, the geothermal energy generation system 100 disclosed tends to address the challenges identified above. More specifically, use of the fully cased downhole well loop 108 removes any risk of cross contamination between the working fluid 200 flowing through the fully cased downhole well loop 108, and any rock formations 320 or formation fluids and any risk that the working fluid 200 will erode the rock formations 320, since the working fluid 200 never comes into contact with the rock formations 320. The velocity of the working fluid 200 may also be greater within fully cased downhole well loop 108, as there is no risk of erosion of rock formations 320 due to the lack of contact. In addition to preventing the erosion of the wellbore walls the addition of casing also eliminates the risk of wellbore instability and rock mass failure due to the in-situ and induced stresses around the wellbore. In prior art systems, in order to achieve minimal cross contamination, the velocity of the working fluid must be carefully managed and monitored to ensure that there is minimal erosion on any wellbores or underground sections. Ensuring that there is minimal to no erosion is important, not just from the perspective of preserving the environment, but also to avoid creating instabilities in rock formations 320 that could lead to earthquakes or other potential consequences. Furthermore, because working fluid 200 is isolated from rock formations 320, there is no risk of dissolving of minerals or other substances that may change the composition of working fluid 200. In other prior art where the working fluid 200 may be in contact with the surrounding rock formations 320, there is a risk of dissolving minerals or other substances that the working fluid 200 may come into contact with, especially while working fluid 200 erodes at the rock formation 320 surfaces, and undergoes heat changes. The dissolving of minerals may also lead to the depositing of said minerals in pipes or other components of the geothermal energy generating system 100 when working fluid 200 cools, creating blockages and adding maintenance to system 100.

Fully cased downhole well loop 108 is pressure tested and is cemented to the surrounding rock formation 320 underground. Due to its construction, any working fluid 200 finding its way out of fully cased downhole well loop 108 is greatly minimized. As such, the risk of any working fluid 200 leaking or finding its way out of the fully cased downhole well loop 108 and potentially causing pollution or other environmental concerns is greatly minimized, especially when working fluid 200 undergoes significant changes in temperature and pressure. In contrast, other prior art systems may suffer fluid losses due to leak off into formation and/or fluid contamination from influxes of formation fluids due to the working fluid not being fully isolated from the rock formations 320. This would be from not being cased including being unable to successfully obtain a valid pressure test. As a result, the fully cased downhole well loop 108 can use non-conventional working fluids 200 with different thermal capacities, and different phase transition points, hence allowing for potentially more energy efficient systems, greater power generation, and geothermal generation systems with smaller footprints, while reducing the concern of contaminating the environment. Furthermore, parasitic power loss is minimized. A person skilled in the art will recognize that parasitic losses may be described as the absorbed power being the energy required to operate pumps, cooler fans and other loads, reducing the net energy output of a system. A person skilled in the art will also recognize that net energy is power produced subtracted by power used to operate the system.

The casing material for fully cased downhole well loop 108 may be steel. Unlike in other prior art, where a chemical liner may be used, steel being a hardened and inert material, along with the support of the cement may withstand high pressures. Furthermore, there is a lesser risk of steel chemically interacting with working fluid 200, allowing for a greater selection of working fluid 200 for the geothermal energy generating system 100. In addition, the construction and application of a steel casing is substantially safer in comparison with a chemical liner when ensuring that there are no leaks within fully cased downhole well loop 108.

By using a single heat exchange loop with a single working fluid 200, as opposed to two loops with two working fluids, there is a significant reduction in parasitic loss of energy, as the heat is retained in the single working fluid 200 and is not lost to the environment in any transfers of heat when there are multiple working fluids.

Additionally, as working fluid 200 is fully contained within the geothermal energy generating system 100, the working fluid 200 may be easily changed if environmental conditions change. For example, if the temperature underground changes, the working fluid 200 can be easily replaced with another working fluid 200 with a lower boiling point. This allows the geothermal energy generating system 100 to continue to operate without the need for structural changes, such as adjusting the depth of the lateral sections to obtain the heat required.

Providing two lateral sections underground with a multilateral connector to connect the two lateral sections, allows for the injection well 112 and production well 128 to be in relatively close proximity to each other. As such, the geothermal energy generating system 100 tends to occupy a smaller footprint, both underground and the above ground surface area, as compared to other prior art systems. The smaller footprint may lead to reduced capital and operating costs. For example, U.S. Patent Application Publication No. 2011/0048005, has a single horizontal pipeline underground. This leads to the injection wellhead and the production wellhead being at significantly larger distances away from each other and hence occupying a larger footprint than the embodiments described below. The larger footprint may lead to inefficiencies in heat transfer and significant construction costs.

Figure 2:
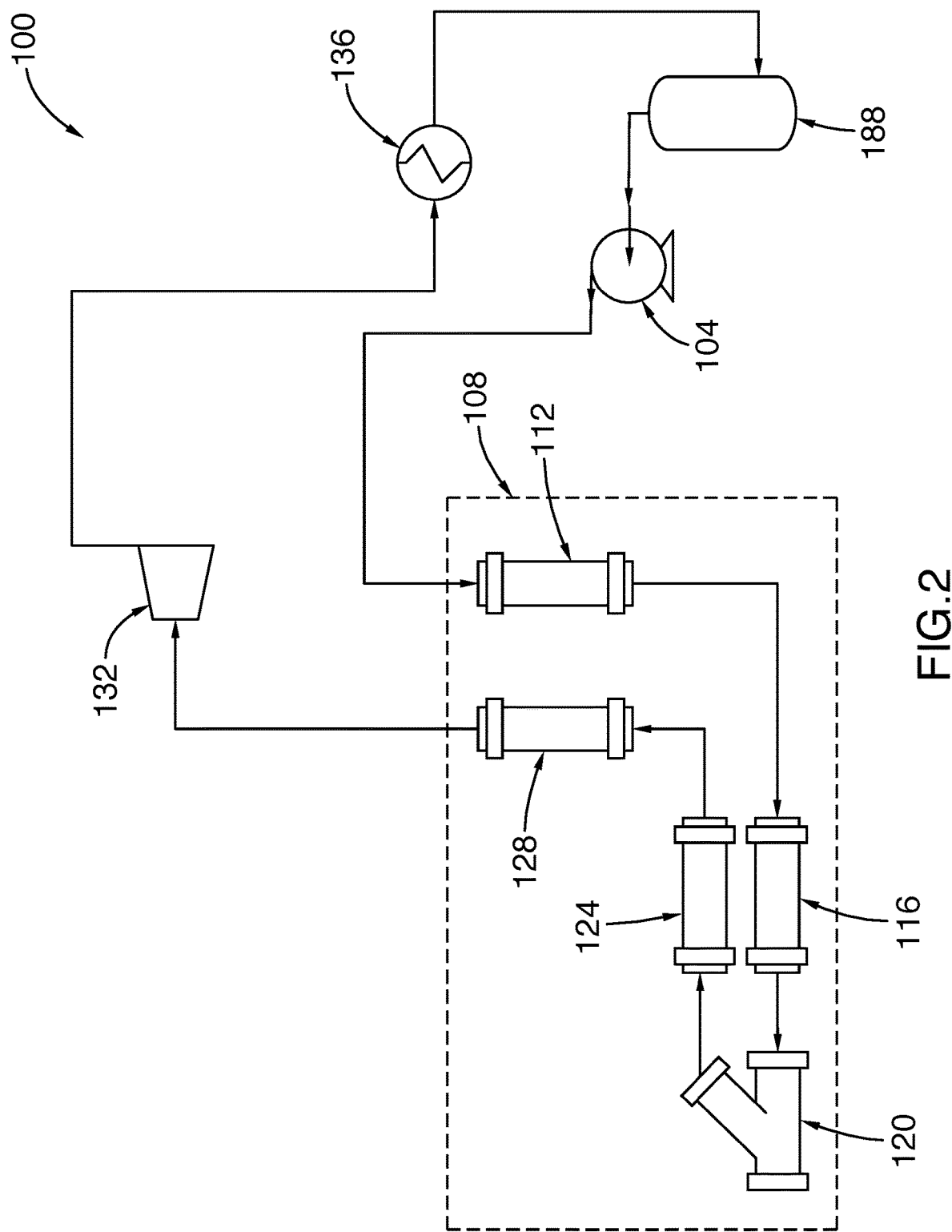
FIG. 2 is a conceptual schematic view of the system for generating energy from geothermal sources shown in FIG. 1.

Referring to FIGS. 1 and 2, there is shown an embodiment of the geothermal energy generating system 100. The main components of the geothermal energy generating system 100 include fully cased downhole well loop 108, more specifically, the injection well 112, the first lower lateral section 116, the multilateral connector 120 (also referred to herein as cross connect splitter 120, or multilateral junction 120), the second upper lateral section 124 and the production well 128. The geothermal energy generating system 100 further includes the pump 104 and the turbine system 132 fluidly connected to the fully cased downhole well loop 108. More specifically pump 104 is connected to injection well 112, and turbine system 132 is connected to production well 128. The cooler 136 is fluidly connected between the turbine system 132 and the pump 104 closing the circuit for the single heat exchange loop.

As shown in FIG. 1, an additional wellbore 140 is disposed adjacent the fully cased downhole well loop 108. This wellbore 140 (also referred to herein as connection wellbore 140, access wellbore 140, or sacrificial wellbore 140) is drilled to aid in the construction of fully cased downhole well loop 108, however, it is not a part of the geothermal energy generating system 100 and does not contribute towards the normal operations of the geothermal energy generating system 100. Wellbore 140 will be further described below with regards to the construction of the geothermal energy generating system 100.

As can be seen in FIG. 1, the direction of flow for the liquid working fluid 204 is depicted by the solid lined arrows, and the direction of flow for the gaseous working fluid 208 is depicted by the dashed arrows. The details regarding the operation and phase change of the working fluid 200 will be further described below.

While fully cased downhole well loop 108 is underground in the surrounding rock formations 320, there are access points to fully cased downhole well loop 108 located on the surface 316—more specifically, an inlet 112A located at an upper end 180 of the injection well 112 and an outlet 128A located at an upper end 192 of the production end 128. The inlet 112A is part of the injection well 112 and is configured to be the entry point on the surface 316 for the liquid working fluid 204. The inlet 112A is surrounded by a surface casing 144. Similarly, the production well 128 includes an outlet 128A configured to be the exit point on the surface 316 for the gaseous working fluid 208. The outlet 128A is surrounded by a surface casing 148, surface casing 148 being similar to surface casing 144. In the current embodiment, except for the aforementioned inlet 112A, outlet 128A, and surface casings 144 and 148, the remainder of fully cased downhole well loop 108 is underground. Surface casings 144 and 148 are provided to isolate those segments of injection well 112 and production well 128 that are in proximity to the surface 316, from fresh ground water and to prevent the escape or migration of the working fluid 200 into the groundwater and/or environment. Particulars relating to the construction of the surface casings 144 and 148 are provided below. It will occur to a person skilled in the art that reference to rock formations 320 is not limited to rocks, but may include any geological formation or combinations of geological formations that are underground.

Furthermore, in the current embodiment, the inlet 112A of the injection well 112 and the outlet 128A of the production well 128 are in proximity to each other. By locating the injection well 112 and production well 128 in proximity to each other, geothermal energy generating systems 100 may have a smaller footprint as compared to prior art systems on the surface 316. In this embodiment, inlet 112A and outlet 128A are at a distance of 50 m away from each other, however, inlet 112A and outlet 128A may at a distance between 7 m and 50 m. In addition, in a preferred embodiment, the distance between inlet 112A and outlet 128A would be less than either the length of upper lateral section 124 or the length of lower lateral section 116. In addition, a preferred embodiment of the size of the footprint of the geothermal energy generating system 100 on the surface, would be 22500 m² or 150 m×150 m. However, the configuration of the inlet 112A, the injection well 112, the outlet 128A, the production well 128, the lower lateral section 116 and the upper lateral section 124 may not be limited based on the location of the inlet 112A and the outlet 128A. In other configurations, inlet 112A may be at a significant distance from outlet 128A. In fact, in some alternate configurations of the fully cased downhole well loop 108, lower lateral section 116 and upper lateral section 124 may be at the same depth. A person skilled in the art will recognize the different potential configurations of fully cased downhole well loop 108 and the different potential placements of inlet 112A, injection well 112, outlet 128A and production well 128.

The entirety of piping, wells and sections of fully cased downhole well loop 108 are lined with cement 152 and cased with steel 156. More specifically, in the current embodiment, steel pipes are cemented within the wellbores of injection well 112 and production well 128, as part of both the lower and upper lateral sections 116 and 124, as part of the multilateral connector 120 and any connecting pieces between said components. The entire fully cased downhole well loop 108 is pressure tested to ensure that there are no leaks. The pressure test may be defined as a hydraulic pressure test where the continuously joined steel casing 156 is subjected to a minimum downhole pressure associated with the greatest pressure upon which the fully cased downhole well loop 108 may be subjected to. The greatest pressure that fully cased downhole well loop 108 may be subjected to may be a point along fully cased downhole well loop 108 with the greatest depth, and is likely to be along lower lateral section 116. In certain embodiments, to determine the total downhole pressure for pressure testing, the following formula may be used:

Pressure at surface+Hydrostatic pressure

Where the hydrostatic pressure may be calculated as (Greatest depth×Specific gravity of water).

For example if the deepest point along fully cased downhole well loop 108 is along lower lateral section 116 at a 2500 m depth and the pressure applied at the surface is 2 MPa, where the specific gravity of water is 10 KPa/m, the total downhole pressure may be calculated by adding the surface and hydrostatic pressures, specifically in this example 2 MPa+(2500 m×10 KPa/m)=21 MP.

Pressure testing is performed using water, as in the event of any leakage due to the high pressures, the leaking water does not create any pollution to the surrounding environment. The above formula using the hydrostatic pressure of water may be used for working fluids 200 where the specific gravity of water is greater than that of the specific gravity of working fluids 200. For example, the specific gravity of propane is less than that of water, and hence the formula above provides a higher pressure testing than what is required for propane as a working fluid 200, ensuring safe operation of fully cased downhole well loop 108. A person skilled in the art will recognize that if working fluid 200 has a higher specific gravity than water, then the above formula may be compensated by providing the specific gravity of said working fluid 200, and then pressure-testing fully cased downhole well loop 108 accordingly with water. Furthermore, in certain embodiments, the calculated total downhole pressure for pressure testing above may be increased to provide a safety factor, hence testing the fully cased downhole well loop 108 with a higher pressure than the operational limits for safety reasons. The pressures that fully cased downhole well loop 108 are built to and pressure-tested to withstand are pressures that are not seen in prior art systems for the generation of energy from geothermal sources. This is due to the fact that the operational pressures of working fluids in prior art systems tend to be much lower than those of working fluid 200 while flowing through fully cased downhole well loop 108.

The pressure-tested fully cased downhole well loop 108 is able to receive and convey working fluids 200 pressurized between 7 MPa and 31 MPa. In an embodiment where working fluid 200 is a pentane, pressure-tested fully cased downhole well loop 108 may receive and convey working fluid 200 between 7 MPa to 22 MPa. In a preferred embodiment, where the working fluid 200 is propane, pressure-tested fully cased downhole well loop 108 may receive and convey propane working fluid 200 between 7 MPa to 20 MPa.

During its operation, fully cased downhole well loop 108 may be capable of withstanding pressures of at least 7 MPa. In other embodiments, pressure-testing of fully cased downhole well loop 108 may include pressure-testing up to 31 MPa and may be designed to burst or fail at a maximum of 39 MPa.

Cement 152 is used to structurally secure steel 156 casing to the surrounding rock formations 320, however in alternate embodiments, cement 152 may be mixed with other substances, such as the addition of hematite to adjust the thermal conductivity of cement 152. While in the current embodiment, cement 152 and steel 156 are used, it will occur to a person skilled in the art that any other materials may be used as a barrier, as long as they physically isolate the working fluid 200 from the exterior environment/rock formations 320, can undergo the pressure requirements from both the working fluid 200 expanding and contracting while undergoing phase change, and as long as heat may conduct through the material.

The injection well 112 runs from the inlet 112A at the surface 316 vertically downward underground a predetermined distance (or depth). The predetermined distance (or depth) may be determined on a site by site basis depending on geothermal gradient, rock thermal properties, geology and geological composition of the targeted area. The geothermal gradient and rock thermal properties are variables to consider to determine the depth and residence time at said depth to induce a phase change on working fluid 200. Depth of injection well is chosen to achieve high rock temperature while minimizing drilling cost which increases with many factors, including the depth and geological composition of rock formations 320. In the current embodiment, at its lower end 196, the injection well 112 is joined to the lower lateral section 116 by a curved connecting piece 160. However, lower lateral section 116 may be connected to injection well 112 and extend away from injection well 112 at any location along injection well 112. The injection well 112 has a depth of between approximately 1000 m and 4000 m and production steel casing 156 with an internal diameter of approximately 139 mm based on the preferred working fluid temperature of 140° C. to be achieved. However, the injection well could be sized differently (i.e. be drilled to a different depth, whether at a greater depth or a shallower depth, and have a different diameter, whether larger or smaller), if required to suit a particular application. In the embodiment depicted in FIG. 1, the injection well 112 is shown extending vertically downward into the ground. It will be appreciated that this need not be the case in every embodiment. In some embodiments, the injection well could extend downwardly into the ground at an angle from vertical.

In the preferred embodiment, the lower lateral section 116 can be seen to be perpendicular to the injection well 112, and extend laterally away therefrom toward the XC connector 120. Moreover, the lower lateral section 116 has a length of approximately 2000 m to 4000 m and production steel casing 156 with an internal diameter of approximately 139 mm. In other embodiments, the lower lateral section 116 need not be disposed laterally relative to the injection well 112 and could extend away from the injection well 112 at an angle from lateral. It could also be sized differently.

Joining the lower lateral section 116 to the upper lateral section 124 is the multilateral connector 120. Multilateral connector 120 may include an XC splitter or other comparable connection device, which may be connected between lower lateral section 116 and upper lateral section 124 in a manner which ensures fully cased downhole well loop 108 may be pressure tested and may operate under pressure. For instance, the SAGD XC splitter multilateral system manufactured by Baker Hughes Company. The multilateral connector 120 is well known within the oil and gas industry, and a person skilled in the art will recognize the various types of multilateral connectors 120 available. However, the use of multilateral connector 120 within a geothermal energy generating system is novel.

In the current embodiment, the upper lateral section 124 extends laterally away from the multilateral connector 120 to join the lower end 198 of the production well 128 via curved connecting piece 164. However, the upper lateral section 124 may join production well 128 at any location along production well 128. The upper horizonal section 124 is disposed perpendicular to the production well 128. Moreover, the upper lateral section 124 has a length of approximately between 2000 m and 4000 m and a production steel casing 156 with an internal diameter of approximately 139 mm. In other embodiments, the upper lateral section 124 need not be disposed laterally relative to the production well 128 and could extend toward the production well 128 at an angle from lateral. It could also be sized differently.

In the embodiments where lower lateral section 116 is disposed laterally relative to injection well 112, and where upper lateral section 124 is disposed laterally relative to the production well 128, both lateral sections 116 and 124 may be on the same vertical plane. However, it will occur to a person skilled in the art that in alternate configurations, lateral sections 116 and 124 may be offset from each other in the vertical plane.

In this embodiment, the production well 128 does not extend as deeply into the ground as injection well 112. Preferably, the production well has a depth of 1000 m to 4000 m and a production steel casing 156 with a diameter of approximately 139 mm. However, the production well could be sized differently (i.e. be drilled to a different depth, whether at a greater depth or a shallower depth, and have a different diameter, whether larger or smaller), if required to suit a particular application.

In the current embodiment, the length of the upper lateral section 116 is shorter than that of the lower lateral section 116 due to the location of inlet 112A and outlet 128A. The lengths of each of the lower lateral section 116 and upper lateral section 124 are selected based on the amount of time that the working fluid 200 needs to remain underground in contact with the heat-emitting rock formations 320 (i.e. residence time) and the flow rate of the working fluid 200. For example, if the working fluid 200 takes a longer time to heat up to undergo the phase change, whether due to the heat conductive properties of the surrounding rock formations 320, well casing and lining of lateral sections 116 and 124, or due to the properties of the type of working fluid 200 being used, then both lateral sections 116 and 124 may need to be longer to accommodate the time that working fluid 200 needs to be heated to induce a phase change. Flow rate is another variable that needs to be taken into account, as a lower flow rate means that the distance traveled over time is lower, and as such the length of lateral sections 116 and 124 may further be adjusted.

In a preferred embodiment, lower lateral section 116 runs deeper than the upper lateral section 124. Having two lateral sections 116 and 124 at different depths may enhance thermal uptake from surrounding rock formations 320 as there may be less thermal interference between wells 112 and 128. However, fully cased downhole well loop 108 is not limited to this configuration. In alternate embodiments (not shown), the lateral section returning to the production well 128 may be located deeper than the lateral section connected to the injection well 112. In addition, in alternate embodiments (not shown), both lateral sections 116 and 124 may be at the same depth, but may be at an angle from each other, where multilateral connector 120 connects the two lateral sections 116 and 124 from different angles. A person skilled in the art will recognize the different potential configurations and lengths available for both lateral sections 116 and 124, and also different potential configurations for fully cased downhole well loop 108 overall.

As shown in FIGS. 1 and 2, located on the surface 316, the pump 104 is fluidly connected to the inlet 112A of the injection well 112. The pump 104 is operable to circulate the working fluid 200 through fully cased downhole well loop 108 entering through the inlet 112A of injection well 112 and proceeding underground.

Pump 104 is also configured to keep liquid working fluid 204 flowing through the entire single heat exchange loop by maintaining an appropriate flow rate of the working fluid 200. Flow rate (and accordingly residence time) is determined by underground well loop to conduct enough heat energy to convert working fluid from a liquid to a gas of sufficient temperature. In the current embodiment, the liquid working fluid 204 received by pump 104 may be in the pressure range of 500 kPag to 2000 kPag, and in the temperature range of 10° C. to 40° C. Pump 104 is configured to increase pressure from a range of 700 kPag to 3000 kPag, and maintain a flow rate of 15 kg per second to 25 kg per second. In a preferred embodiment, pump 104 is able to provide a liquid working fluid 204 to the inlet 112A of injection well 112 at approximately 1300 kPag in pressure and at a temperature of approximately 30° C. A preferred embodiment of pump 104 is the use of a liquid pump for thermodynamic efficiency. A liquid pump keeps parasitic energy losses of the system to a minimum compared to the use of mechanical gas compressors.

In other prior art geothermal systems, where the working fluid 200 comes into contact with rock formations 320 due to the lack of casing, or where the working fluid 200 may pickup debris underground, pumps may need to be substantially more robust, and may need to handle abrasive materials during operation. Furthermore, in prior art systems where working fluid 200 is water, pumps may need to handle water chemistries with scale forming characteristics during operation. In contrast, in the current embodiment, as fully cased downhole well loop 108 is fully lined with cement 152 and cased with steel 156, the working fluid 200 does not come into contact with any rock formations 320, and is physically isolated from the environment. As such, the working fluid 200 does not pick up any debris, and remains as a clean homogenous fluid. This allows pump 104 to have a long service life with minimal maintenance hence saving on procurement and operation costs and potentially allowing use of less robust or standard pump designs.

In a preferred embodiment, pump 104 may be a positive displacement type pump with a variable speed drive controller. Positive displacement pump types typically have high overall thermal efficiency and are able to maintain desired outlet head when paired with a variable speed drive. Positive displacement pump types include plunger, gear or rotary vane type pumps. However, as will be evident to a person skilled in the art, pump 104 may also be any type of pump that can handle the abovementioned pressures and temperatures. This may include, but is not limited to centrifugal pumps or diaphragm pumps. A person skilled in the art will recognize the different potential pumps that may be used based on the aforementioned pressure, flow rate and temperature specifications as well as purchase and maintenance costs.

Also above ground is the turbine system 132 which is fluidly connected to the upper end 192 of production well 128. The turbine system 132 may include a turbine (not shown) with an output shaft connected to an electrical power generator (not shown).

In the current embodiment, turbine system 132 is located in close proximity to outlet 128A to prevent loss of heat from the gaseous working fluid 208 as it travels along insulated pipes between outlet 128A and turbine system 132. In other embodiments turbine system 132 may be located further away form outlet 128A, but this tends not to be preferred. While the exterior surface pipes carrying the gaseous working fluid 208 to the turbine system may be insulated, heat and pressure may still be lost, and as such travel distance and time is an important consideration. A person skilled in the art will be familiar with the structure, configuration and operation of turbine system 132 and the associated electric power generator such that they need not be described herein.

In operation, the turbine system 132 receives the gaseous working fluid 208 from the outlet 128A of production well 128, and the gaseous working fluid 208 drives the turbine connected to the shaft. The mechanical energy generated by the rotation of the turbine is transferred to the electric power generator, which can convert the mechanical energy into commercially saleable electrical power. The electrical power may then be routed to a utility owned power grid for further distribution. In the current embodiment, turbine system 132 may generate between 0.5 MW to 2 MW in power. In a preferred embodiment, turbine system 132 may generate approximately 1 MW in power.

Alternatively, if the power is not needed by the power grid, it may be routed towards batteries, other local loads, or may just be wasted for short periods of time through an electrical resistive load bank. The use of a load bank to waste power allows equipment to be operated without live connection to a power transmission line. This may be done for equipment testing and short periods of operational upsets (not shown).

In other embodiments, turbine system 132 may include either a turbine expander, a piston expander, or a scroll expander. In a preferred embodiment a turbine expander(s) is used, where the turbine expander(s) may be radial or axial, where the radial turbine expander is connected to one end of a shaft, and an electrical power generator connected to the other end of the shaft. The expander output power shaft may connect directly or via a speed reduction gear box to the electrical power generator. The speed reduction gearbox may match the high speed (rpm) turbine wheel to the desired operating speed of the power generator. The type of expander and power generator will dictate if a gear box and type of gear box is required. In alternative embodiments, turbine expanders may also be volumetric type machines such as scroll, screw and vane expanders could also be used. The preferred output of the geothermal energy generating system 100 is targeted to be over 1 MW produced by each expander which makes high speed and compact turbo expanders a preferred embodiment as volumetric type expanders become large and expensive for the targeted power output amount.

In another embodiment, multiple expanders may be used to maximize power generated. Use of multiple expanders is beneficial when trying to limit the size of an expander for constructability or turn down efficiencies or to allow certain working fluids 200 to expand (flash) in stages, where the $1^{st}$ stage flash occurs in the primary expander, but energy exists in the working fluid that can be flashed again to a lower pressure or in parallel to the first stage flash, Where a turbo expander is included, the gaseous working fluid 208 may be expanded as it passes through the conically contained radial turbine, hence reducing the pressure and the temperature of the gaseous working fluid 208, while driving the turbine. Similar to that of the previous embodiment of turbine system 132, the rotation of the radial turbine creates mechanical energy which is transferred to the electric power generator, where it is converted into commercially saleable electrical power. The voltage from the power generators can be increased with a power step up transformer to match requirements of third party electrical power transmission lines for power sales to desired markets.

A low pressure gaseous working fluid 208 is output from the turbine system 132. In alternate embodiments, depending on the properties of the working fluid 200 being used, the turbine system 132 may induce the received input gaseous working fluid 208 to partially change states into a mixture of gas and liquid.

The cooler 136 (also referred to as condenser 136) is disposed between, and fluidly connected to, the turbine system 132 and the pump 104. The cooler 136 is configured to receive the low pressure gaseous working fluid 208 that is output from the turbine system 132, and to cool and condense the low pressure gaseous working fluid 208 into a liquid working fluid 204 through the use of a heat exchanger cooled by forced draft air or through a mechanical chiller (not shown). In an embodiment where working fluid 200 leaving from turbine system 132 and received by cooler 136 is in a mixed state of both gas and liquid, the amount of energy used by cooler 136 may be reduced, as less work may be required to cool working fluid 200 to a liquid state. Alternatively, the residence time of working fluid 200 within cooler 136 may also be reduced. A person skilled in the art will recognize that the specifications of cooler 136 used may depend on the specifications of working fluid 200, the type of turbine system 132, and also the targeted final temperature and pressure of liquid working fluid 204 after exiting cooler 136.

As cooler 136 is fluidly connected to pump 104, the resultant liquid working fluid 204 that is output from cooler 136 is returned to pump 104 to be sent through fully cased downhole well loop 108 again. Preferably, the cooler 136 is a finned tubed type with forced draft ambient air used as the coolant. This style of condenser cooler 136 is effective and relatively inexpensive. However other embodiments could be used, such as brazed aluminum plate style, tube style or other heat exchanger with working fluid cooled by a segregated coolant.

Connecting pieces 168, 172, and 176 serve as additional pieces to complete the portion of single heat exchange loop above the surface 316. Specifically, connecting piece 168 serves as a connector to fluidly connect the outlet 128A of production well 128 to the inlet of turbine system 132. Similarly, connecting piece 172 fluidly connects the outlet of turbine system 132 to the inlet of cooler 136. In addition, connecting piece 176 serves as a connector to fluidly connect the outlet of cooler 136 with the inlet of pump 104.

As indicated above, fully cased downhole well loop 108 is fully lined and cased to physically isolate working fluid 200 from the rock formations 320 and environment. In the current embodiment, connecting pieces 168, 172, and 176 may be steel pipes, however in alternate embodiments, connecting pieces 168, 172 and 176 may be constructed of other materials that do not leak, and can withstand the pressure and temperature changes above ground. In a preferred embodiment, connecting piece 168 between outlet 128A and turbine system 132 may also be insulated to prevent heat loss prior to gaseous working fluid 208 reaching turbine system 132. However, in alternate embodiments, all surface connecting pieces 168, 172 and 176 may also be insulated to reduce loss of heat, which may lead to parasitic loss. Furthermore, the single heat exchange loop of the geothermal energy generating system 100, which may include connecting pieces 168, 172 and 176 will be pressure tested to ensure that they do not leak when transporting the working fluid 200 while the working fluid 200 undergoes pressure changes. It will occur to a person skilled in the art that in connecting pieces 168, 172, and 176 may be of any shape or size depending on the locations and the specifications of the working fluid 200, outlet 128A, turbine system 132, cooler 136, pump 104 and inlet 112A. It will also occur to a person skilled in the art that in embodiments where components are combined into a single unit, such as cooler 136 and pump 104, that certain connecting pieces may not be needed and could be omitted.

As shown in FIG. 2 the geothermal energy generating system 100 may also include a storage vessel 188 (also referred to herein as storage tank 188) to hold excess liquid working fluid 204 and to provide sufficient and consistent mass flow to pump 104. While not shown, other components, such as valves, heat exchangers, and other instruments may be used to optimize the geothermal energy generating system 100. In alternate embodiments, filters or a filter separator may also be added to the outlet 128A, upstream of turbine system 132, however, in the current embodiment, filters are not essential if all piping is sufficiently clean to remove manufacturing lubricants, mill scale, dirt and other contaminants prior to commissioning of the turbine system 132, as with a single working fluid 200 in a single heat exchange loop, there is little to no debris or foreign particles expected during normal operation.

Figure 3:
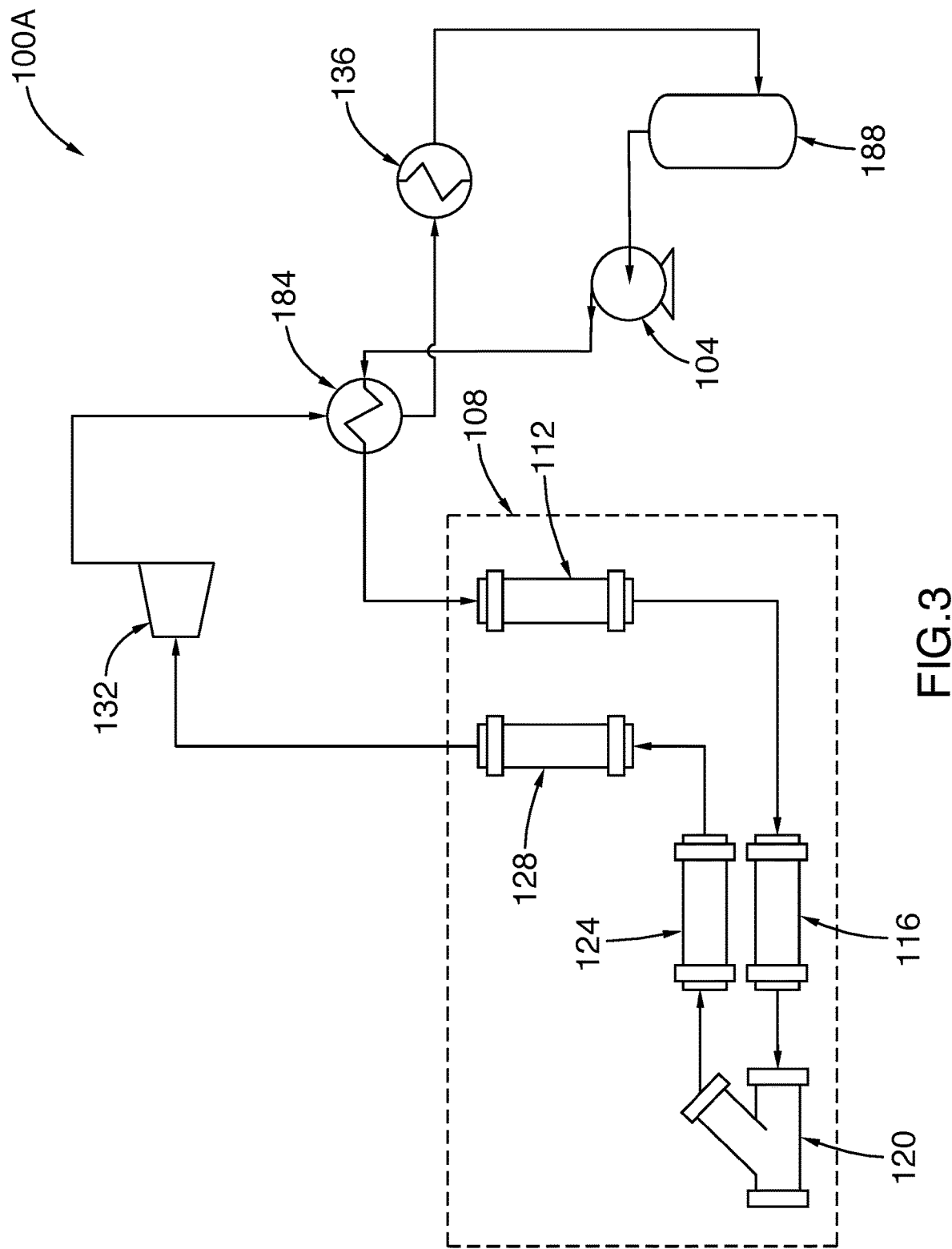
FIG. 3 is another conceptual schematic view of a system for generating energy from geothermal sources in accordance with an alternate embodiment to that shown in FIG. 2.

FIG. 3 depicts a geothermal energy generating system 100A which is an alternate embodiment to that shown in FIGS. 1 and 2. For convenience, like elements or structures shown in FIGS. 2 and 3, are identified with the same reference numerals. System 100A is similar in all material respects to the system 100 except that in geothermal energy generating system 100A, a recuperator 184 (also referred to herein as heat exchanger 184) is provided. The recuperator 184 is disposed between, and connected to the turbine system 132 and the cooler 136, and is also arranged between, and connected to, the pump 104 and the injection well 112. The recuperator 184 is configured to minimize cooling load on the cooler 136 and preheat the liquid working fluid 204 before entering the injection well 112 by cross exchanging heat from the warm low pressure turbine system 132 outlet gaseous working fluid 208 with the cold liquid working fluid 204 from the outlet of pump 104. As warm low pressure gaseous working fluid 208 leaves turbine system 132 and travels through recuperator 184, it may transfer its heat to the cold liquid working fluid 204 that is also going through recuperator 184 from the outlet of pump 104 to the injection inlet 112. By providing heat from the low pressure gaseous working fluid 208 leaving the turbine system 132, to the cold liquid working fluid 204 heading towards injection well 112, heat energy is being saved and reused. The low pressure gaseous working fluid 208 leaving turbine system 132 is headed towards cooler 136 to condense and induce a phase change, and as such, transferring heat energy from low pressure gaseous working fluid 208 prior to cooler 136 reduces the time and energy needed for cooler 136 to condense the gaseous working fluid 208 into a liquid. Furthermore, the liquid working fluid 204 headed towards injection well 112 is on its way underground to be heated, and as such, pre-emptively heating the liquid working fluid 204 may reduce the underground residence time required, hence potentially allowing for shorter lateral sections 116 and 124, or for lateral sections 116 and 124 to be at a shallower depth. A person skilled in the art will recognize the potential of a recuperator 184 and the potential configurations of a geothermal energy generating system with a recuperator 184.

In alternate embodiments, geothermal energy generating system 100 may be used for other purposes other than to generate electricity. For example, the work generated from the geothermal energy generating system 100 may be used to effect other mechanical work. Alternatively, the work generated from the geothermal energy generating system 100 may be used for hydrogen generation.

Figure 4:
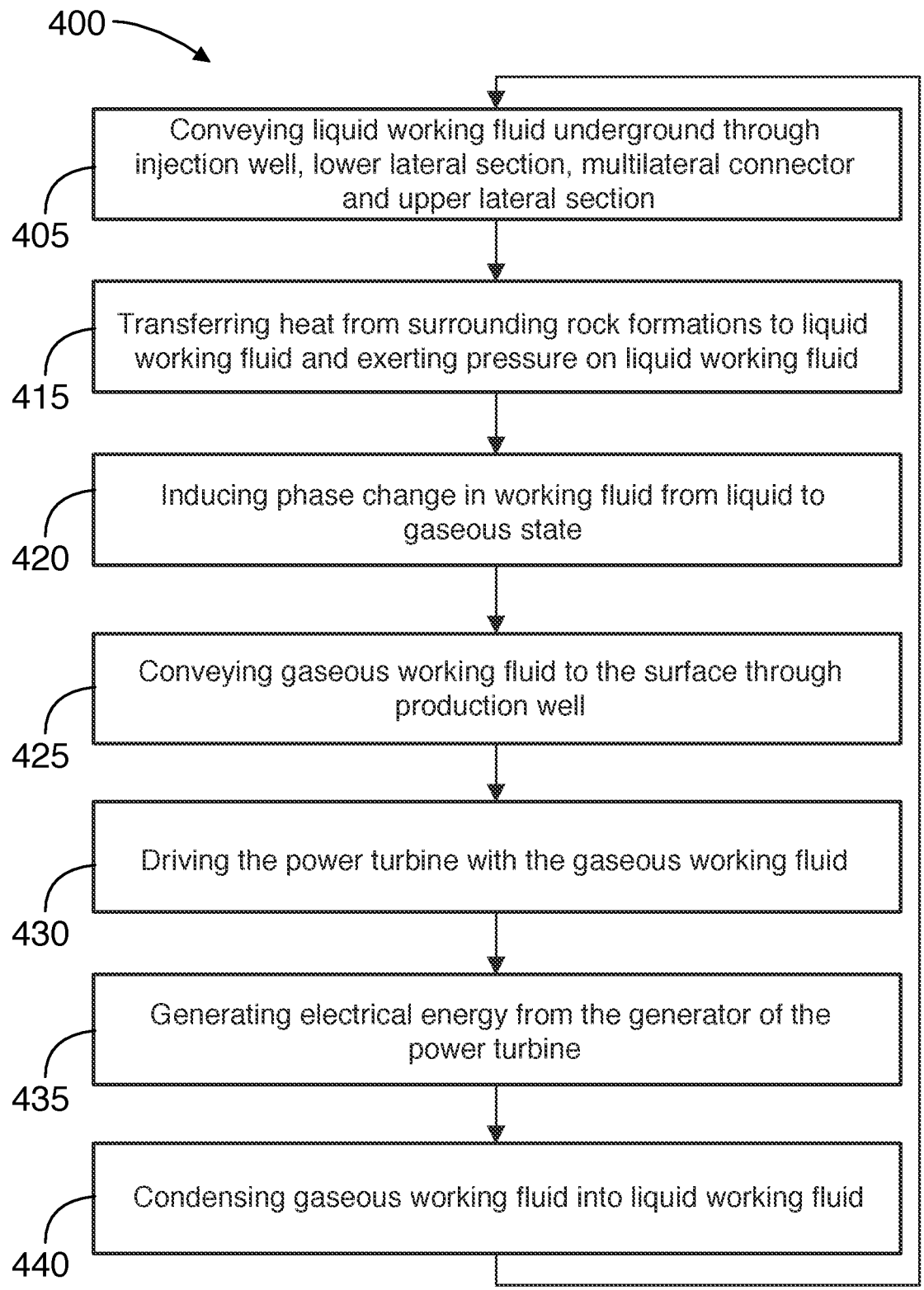
FIG. 4 is a flow chart setting out the steps of a method of generating energy from geothermal sources in accordance with the embodiment shown in FIG. 2.

Referring to FIG. 4, there is shown a flowchart setting out the steps of a method 400 of operating the geothermal energy generating system 100 in accordance with an embodiment of the invention. The operation of geothermal energy generating system 100 occurs after the system has been primed and initiated, and follows a Rankine cycle (preferably an organic Rankine cycle where an organic carbon-based working fluid is used). An example of priming the geothermal energy generating system 100 includes slowly circulating working fluid 200 through injection well 112, and allowing any residual liquid or gas (from either the construction process or from the previous operation of the geothermal energy generating system 100) to exit into a storage vessel to be collected. Once all residual liquid or gas has been removed, the working fluid 200 may continue circulating through the geothermal energy generating system 100 as part of its normal operation. As can be seen, method 400 is a loop. For ease of understanding, the process may be described as being started at step 405 and ending at step 440 before starting the process again at step 405.

As previously described, geothermal energy generating system 100 is a single heat exchange loop with fully cased downhole well loop 108. As fully cased downhole well loop 108 is fully cased and pressure tested, working fluid 200 may be a variety of liquids, gases or plasmas. In alternate embodiments, working fluid 200 may be a carbon-based commercially available and environmentally friendly refrigerant or mix of refrigerants, such as 90% propane with 10% mole fraction ethane. Alternatively, working fluid 200 may be either a composition (a heterogenous working fluid 200) or a singular substance (a homogeneous working fluid 200) of hydrocarbon, carbon dioxide, or ammonia. In a preferred embodiment where the geothermal energy generating system 100 is an organic Rankine cycle, working fluid 200 may be propane. With propane, at a depth of 2000 m and a rock formation 320 temperature of about 160° C., a maximum temperature achieved by propane working fluid 200 is about 140° C. Furthermore, propane working fluid 200 may be condensed into a liquid state working fluid 208 on a hot summer day without substantial cooling using ambient air forced across a fin tube cooler 136. Although propane is the working fluid 200 of choice, other organic (carbon-based), such as a hydrocarbon, or hydrocarbon blends my be used. Hydrocarbon blends may be used to maximize working fluid 200 return pressures. Hydrocarbon blends allow the working fluid 200 to be tailored to specific depth and temperature conditions. For example, the addition of ethane to a majority propane working fluid 200 would allow for earlier wellbore flashing at a specific rock formation 320 temperature. The early flashing would allow for an increased working fluid 200 flow rate and therefore an increase in power generation. Another example is to blend hydrocarbon with butane to increase the heat carrying capacity of the working fluid. By blending heavier hydrocarbons, the flash point/vaporization point along fully cased downhole well loop 108 may be adjusted depending on the temperature of the surrounding rock formations 320. For example, the vaporization point may be adjusted based on the temperature of the surrounding rock formations 320 to be along the upper lateral section 124 or the production well 128, to maximize velocity of the working fluid 200, and minimize the friction of the working fluid 200 along the remainder of the pipe before exiting fully cased downhole well loop 108. A person skilled in the art will recognize the potential combinations of rock formation 320 temperature and different variations of hydrocarbon blends to adjust the location of the vaporization point along fully cased downhole well loop 108. While working fluid 200 may also be water, it is preferably one of the abovementioned fluids, as the abovementioned substances have lower boiling points than water, requiring less residence time underground. Furthermore, the abovementioned fluids may have advantageous thermal capacities, and different phase transition points, allowing for a more efficient system, and requiring less residence time underground in fully cased downhole well loop 108.

The below steps depict an embodiment where working liquid 200 is propane. At step 405, the propane liquid working fluid 204 is conveyed underground by flowing down injection well 112 and along lower lateral section 116, multilateral connector 120 and upper lateral section 124. In order to reach injection well 112, liquid working fluid 204 is pumped using pump 104. In fact, working fluid 200 is circulated through the fully cased single heat exchange loop using pump 104. To ensure proper circulation, pump 104 will increase the pressure of liquid working fluid 204 from 1080 kPag to 1300 kPag to be received by inlet 112A of injection well 112. In the current embodiment, where the working fluid 200 is propane after departing pump 104 and prior to being received by inlet 112A, liquid working fluid 204 may have an approximate temperature range of about 10° C. to about 40° C., with a preferred temperature of about 20° C. and an approximate pressure range of about 1000 kPag to about 2000 kPag, with a preferred pressure of about 1300 kPag. Once the liquid working fluid 204 has been received by inlet 112A, it flows downwards along vertical injection well 112.

When liquid working fluid 204 reaches the curved connecting piece 160, the direction of flow of liquid working fluid 204 transitions from vertical to lateral and then continues along the lower lateral section 116. Liquid working fluid 204 then reaches multilateral connector 120, where it will change direction to flow into the upper lateral section 124 and continue flowing until the curved connection piece 164 adjacent to the lower end 198 of production well 128.

Towards the lower end 196 of injection well 112 and at the depths that lower lateral section 116 is located, the surrounding environment and rock formations 320 naturally conduct heat from the surrounding rock formations 320. As the liquid working fluid 204 flows downwards along injection well 112, when liquid working fluid 204 reaches a certain depth where the rock formations 320 temperature exceeds the liquid working fluid 204 temperature, heat is transferred from the surrounding environment or rock formations 320 to liquid working fluid 204 (at step 405). The heat transfer may occur while liquid working fluid 204 is still flowing downwards through injection well 112, and will continue to occur while liquid working fluid 204 is flowing through connecting piece 160 and lower lateral section 116. This heat may be conductively transferred from the surrounding environment to liquid working fluid 204 through the cement lining 152 and steel casing 156. The depth threshold that the liquid working liquid 204 begins to receive heat, and hence increases the temperature of liquid working fluid 204 is where the temperature of the surrounding environment is greater than that of liquid working fluid 204. This depth threshold depends on the geothermal gradient at the site and working fluid re-injection temperature. The heat will continue to transfer to liquid working fluid 204 as the liquid working fluid 204 flows through multilateral connector 120 and upper lateral section 124, thereby raising the temperature of liquid working fluid 204 as it flows through said components.

Furthermore, as liquid working fluid 204 flows downwards in injection well 112, the pressure exerted on the liquid working fluid 204 increases, as a consequence of the hydrostatic head (at step 415). As liquid working fluid 204 reaches connecting piece 160 and lower lateral section 116, the pressure of liquid working fluid 204 will continue to increase as the fluid absorbs heat energy. There may be a slight reduction in pressure due to flow rate frictional losses in the wellbore, however liquid working fluid 204 will have a net increase in pressure. The approximate pressure of the liquid working fluid 204 upon reaching the lower end 196 of injection well 112/connecting piece 160 is approximately 10,000 kPag, at the approximate depth of 2000 m as is provided in the current embodiment. While the increase in pressure occurs during a change in depth, the rate of the transfer of heat and consequently the rate of temperature increase of liquid working fluid 204 is dependent on depth, rock thermal conductivity, residence time and rock formation 320 temperature. As such, the increase in temperature will continue while liquid working fluid 204 flows both downwards in injection well 112 and flows laterally along lower lateral section 116. Both the transfer of heat and the increase in exertion of pressure is depicted by step 415.

At step 420, at some point while liquid working fluid 204 is flowing through lower lateral section 116, connecting piece 160, multilateral connector 120, connecting piece 164 and upper lateral section 124, liquid working fluid 204 will undergo a phase change from a liquid to a gaseous state due to the liquid working fluid 204 reaching a boiling point from the heat and from the increased pressure (at step 415). More specifically, the rate of temperature increases until the liquid working fluid 204 begins to vaporize, at which time the temperature will hold constant until all liquid working fluid 204 transforms to a gaseous state (gaseous working fluid 208), then the temperature will increase again as the vapor or gaseous working fluid 208 superheats. It will occur to a person skilled in the art that the temperature and pressure required to vaporize the liquid working fluid 204 will change depending on the specifications of the working fluid 200. In the current embodiment where the working fluid 200 is propane it is vaporized at an approximate temperature of 140° C., and at an approximate pressure of 6250 kPag. In a preferred embodiment the phase change will occur within the upper lateral section 124 or the production well 128 to minimize the amount of friction between working fluid 200 and the remaining length of casing before working fluid 200 exits the fully cased downhole well loop 108, hence maximizing velocity of working fluid 200, however it will occur to a person's skilled in the art that the phase change to the working fluid 200 may occur anywhere underground within fully cased downhole well loop 108. It will occur to a person skilled in the art that the location along the flow path of the working liquid in fully cased downhole well loop 108 will change depending on the configuration of fully cased downhole well loop 108, the lengths and depths of components within fully cased downhole well loop 108, the flow rate of working liquid 200, and the boiling point of the working fluid 200 as well as rock formation 320 temperature, conduction rate from rock through the steel casing 156 and cement 152 into the working fluid 200.

At step 425, the gaseous working fluid 208 rises to the surface 316 through production well 128, and exits fully cased downhole well loop 108 at outlet 128A. As the gaseous working fluid 208 rises to the surface 316, there will be a slight loss in pressure and temperature due to the change in depth, however the temperature of the working fluid 200 will be high enough to maintain the gaseous state of the working fluid 208. The approximate temperature and pressure of gaseous working fluid 208 at outlet 128A is between about 90° C. and about 110° C., with a preferred temperature of about 106° C., and between about 3000 kPag and about 4000 kPag, with a preferred pressure of 3500 kPag. The gaseous working fluid 208 is then conveyed towards turbine system 132 along connector piece 168.

As such, in the current embodiment, as the temperature of liquid working fluid 204 is approximately 30° C. and about 1080 kPag at inlet 112A, and the temperature of gaseous working fluid 208 is approximately 106° C. and about 3500 kPag at outlet 128A, the trip through fully cased downhole well loop 108 by working fluid 200 increased its temperature by approximately 76° C. and increased the pressure of working fluid 200 by approximately 2170 kPag. In addition, in the current embodiment, the residence time of working fluid 200 between entering inlet 112A and exiting outlet 128A is approximately 30 minutes. A person skilled in the art will recognize that the temperature difference and the residence time is affected by multiple factors, including, but not limited to the configuration, depth and lengths of components of fully cased downhole well loop 108, as well as rock formation 320 temperature, rock thermal conductivity, conduction rate from rock through casing 156 and cement 152 into the working fluid 200, and flow rate of working fluid 200.

In the current embodiment, where working fluid 200 is propane, the temperature of the propane may range from an approximate temperature of the ambient surroundings/environment (ambient temperature) when entering fully cased downhole well loop 108 at inlet 112A to 185° C. when exiting fully cased downhole well loop 108 at outlet 128A. The ambient temperature may vary depending on the environment that the geothermal energy generating system 100 is located in and may range between −43° C. to 45° C.

In the current embodiment, turbine system 132 is a turbo expander. At step 430, turbine system 132 receives the gaseous working fluid 208, where the gaseous working fluid 208 will drive the turbine (also referred to herein as turbine wheel) thereby generating mechanical energy. As the turbine wheel is connected to the shaft, which is connected to electrical generator, the mechanical energy is transferred to the electrical generator, which in turn, at step 435, converts the mechanical energy into electrical energy. In the embodiment the gaseous working fluid 208 is expanded by virtue of the shape of the expander/valve and the pressure and temperature of gaseous working fluid 208 is also lowered while spinning the radial turbine connecter to the shaft. The approximate pressure and temperature of the propane gaseous working fluid 208 leaving turbine system 132 is be within the range of about 1500 kPag and about 63° C. and about 700 kPag and about 16° C. In preferred embodiments, the approximate pressure and temperature of gaseous working fluid 208 may be easily condensed from gaseous working fluid 208 to liquid working fluid 204 from the ambient air temperature through cooler 136. The electrical energy generated by the electrical generator at step 435 is approximately 1 MW and may fluctuate depending on cooler condensing pressure at ambient conditions. As such a reduction on the load required for cooler 136 to condense gaseous working fluid 208 will increase the net electrical energy generated by the electrical generator. A person skilled in the art will recognize that any reduction on the parasitic loads, for example, the need to use energy for cooling gaseous working fluid 200, will increase the amount of electrical energy generated, and increase the efficiency of the geothermal energy generating system 100. It will occur to a person skilled in the art that in certain embodiments, depending on the efficiency of turbine system 132 and the specifications of the working fluid 200, the working fluid 200 departing from turbine system 132 may be in a mixed state of both gas and liquid.

At step 440, the gaseous working fluid 208 departing from turbine system 132 may travel along connecting piece 172, and be received by cooler 136. Cooler 136 may condense the gaseous working fluid 208 into a liquid state. At the exit of cooler 136 the temperature and pressure of propane liquid working fluid 204 may be 30° C. and 1080 kPag, but may fluctuate depending on ambient air temperature and pressure.

Upon departure of cooler 136, liquid working fluid 204 may return to pump 104 via connecting piece 176, where the liquid working fluid 204 is once again circulated as can be seen by step 405.

Figure 5:
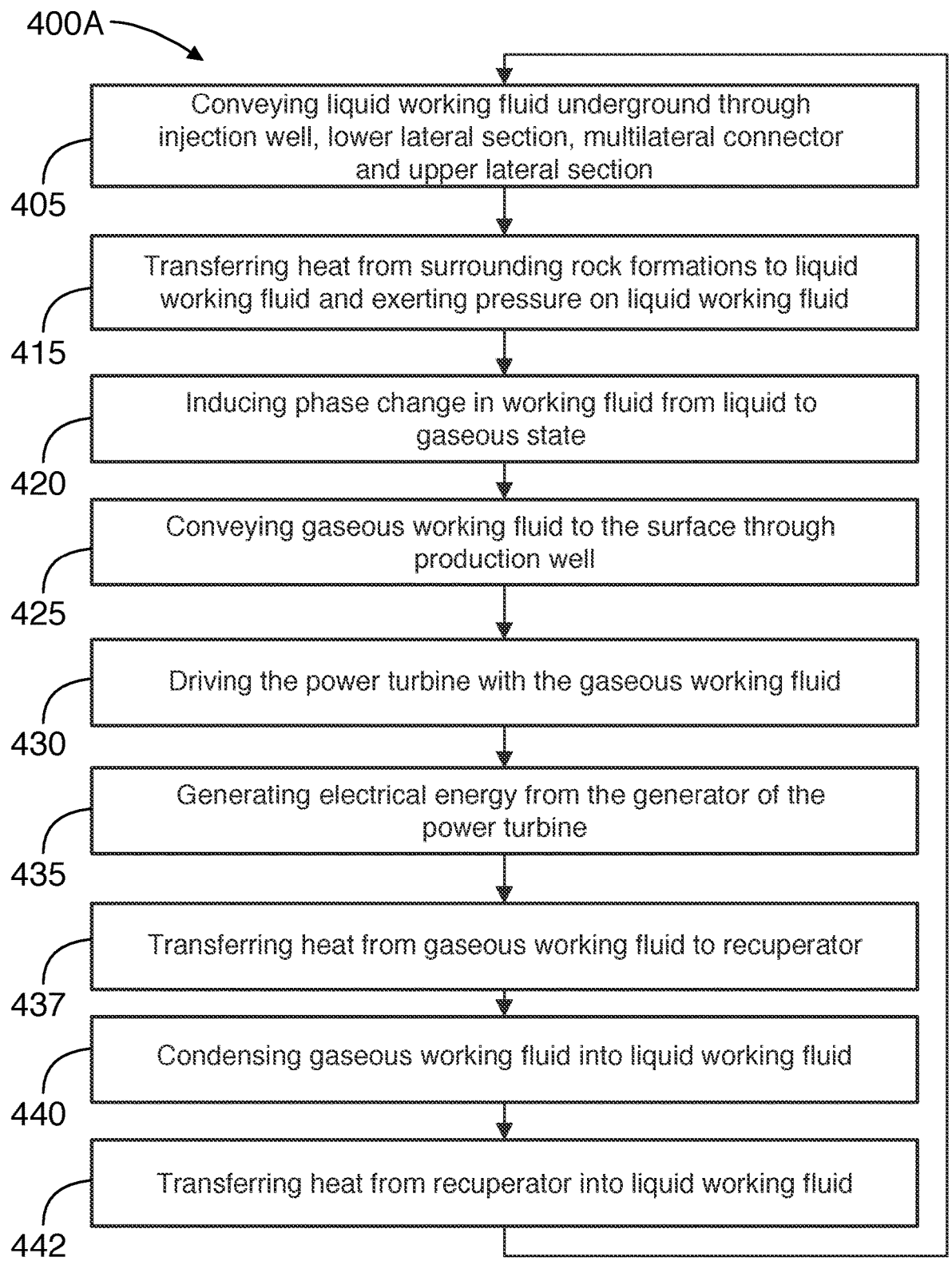
FIG. 5 is a flow chart setting out the steps of an alternate method of generating energy from geothermal sources in accordance with the embodiment shown in FIG. 3.

Referring to FIG. 5, there is shown a flowchart setting out the steps of a method 400A for operating the geothermal energy generating system 100A in accordance with an embodiment of the invention. For convenience, like reference numerals are used in FIGS. 4 and 5 to depict like steps. Method 400A is similar in all material respects to method 400 except that there are additional steps 437 and 432 with relate to the recuperator 184.

Steps 405, 415, 420, 425, 430 and 435 are performed as described above in the context of method 400 shown in FIG. 4. Step 437 occurs after step 435, where the gaseous working fluid 208 transfers heat to a parallel pipe containing liquid working fluid 204 (which is received by liquid working fluid 204 as detailed below at step 442). By transferring heat via recuperator 184, the temperature of the gaseous working fluid 208 drops and hence cooler 136 may require less energy to condense gaseous working fluid 208 in subsequent step 440. The temperature of the gaseous working fluid 208 after departure of recuperator 184 and prior to being received at cooler 136 is a decrease in temperature by approximately 15° C.

Thereafter, step 440 is performed as described above in the context of method 400 shown in FIG. 4, that is, the gaseous working fluid is condensed into liquid working fluid. Following step 440, the liquid working fluid 204 enters recuperator 184 and receives heat therefrom, at step 442. More specifically, recuperator 184 interacts with working fluid 200 at two locations along the single heat exchange loop, specifically after turbine system 132 as gaseous working fluid 208, and after pump 104 as liquid working fluid 204. The two pipes carrying working fluid 200 are in close proximity while in recuperator 184, allowing the transfer of heat from the gaseous working fluid 208 to the liquid working fluid 204. As such, at step 442, the liquid working fluid 204 receives heat from the gaseous working fluid 208 (which is transferred from gaseous working fluid 208 at step 437), thereby raising the temperature of liquid working fluid 204 before continuing onwards to inlet 112A. In this embodiment, the temperature of the liquid working fluid 204 after leaving recuperator 184, and prior to arriving at inlet 112A can be increased by as much as 10° C.

It will occur to a person skilled in the art that the approximate temperature ranges and approximate pressure ranges provided above may change depending on the configuration of the geothermal energy generating system 100 or 100A, and may also change depending on the specifications of the working fluid 200 being used and the ambient air temperature. A person skilled in the art will also recognize that despite being provided approximate temperature ranges and pressure ranges in the aforementioned embodiment where the preferred working fluid 200 is a carbon-based commercially available and environmentally friendly refrigerant, geothermal energy generating system 100 will continue to operate despite the preferred working fluid 200 being outside the approximate temperature ranges and pressure ranges.

Referring to FIG. 6A, an embodiment of the geothermal energy generating system 100-1 is shown, which includes two fully cased downhole well loops, 108A and 108-2, where both two fully cased downhole well loops 108-1 and 108-2 are connected to a single connection wellbore 140. As will be described further below, this facilities the construction as only a single connection wellbore 140 needs to be drilled. Furthermore, by using a single connection wellbore 140, the footprint of the geothermal energy generating system is further minimized. A person skilled in the art will recognize that the geothermal energy generating system 100-1 is not limited to two fully cased downhole well loops, but may any number of fully cased downhole well loops.

Figure 6B:
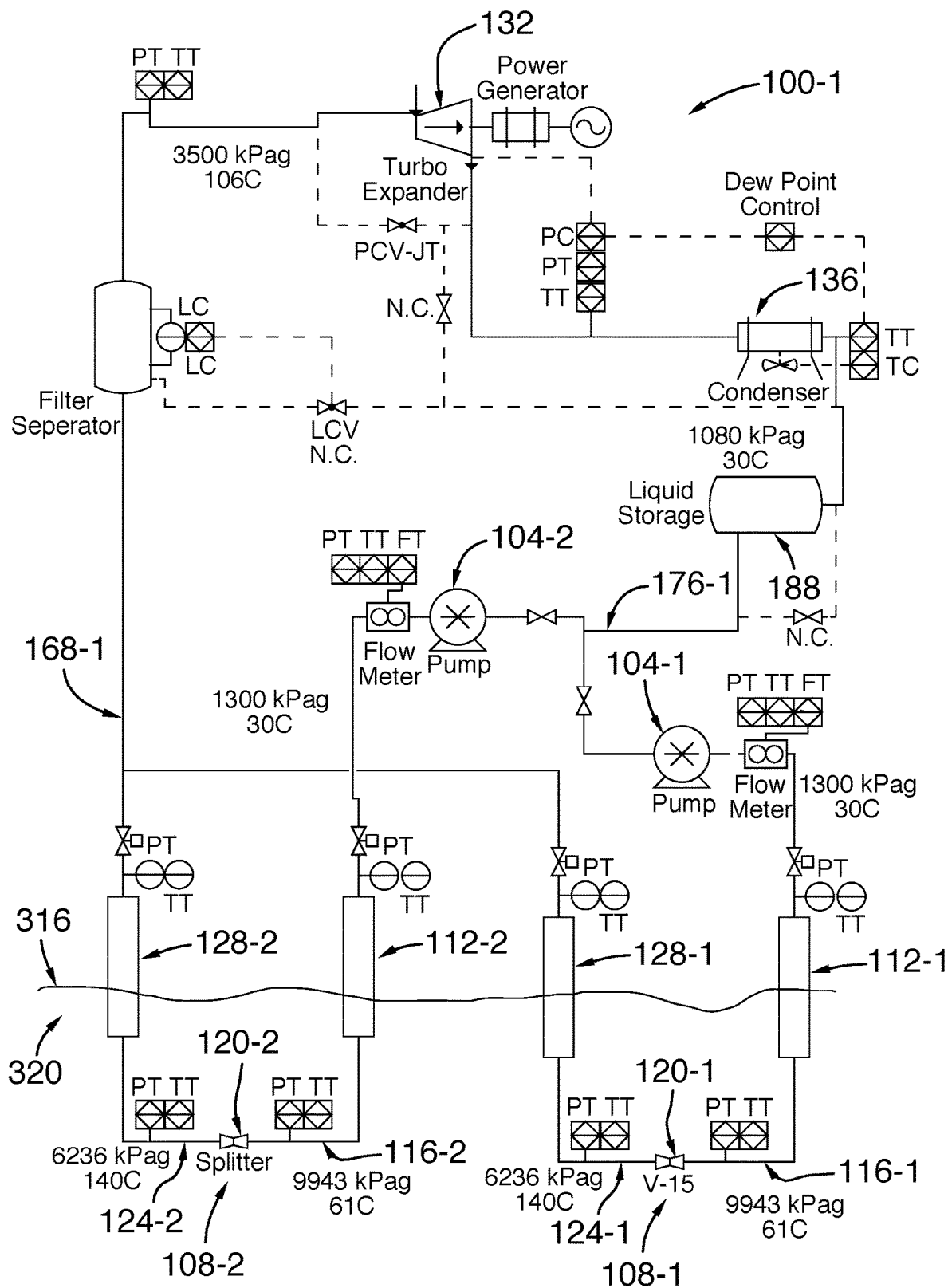
FIG. 6B is a conceptual schematic view of the embodiment of the system for generating energy from geothermal sources of FIG. 6A, where two fully cased downhole well loops are fluidly connected to a single turbine system and single cooler, and where the working fluid is propane.

Referring to FIG. 6B, the components of the two fully cased downhole well loops 108-1 and 108-2 can be seen. The two fully cased downhole well loops 108-1 and 108-2 have similar components to those of previously referenced fully cased downhole well loop 108 in FIGS. 1, 2, and 3. As such, components within each of these two fully cased downhole well loops 108-1 and 108-2 are similarly numbered to those of fully cased downhole well loop 108 and appended with either an -1 or -2 suffix to indicate the first or the second fully cased downhole well loop 108-1 or 108-2. Given that the components are similar, the components will not be described further.

In the embodiment 100-1, the two fully cased downhole well loops 108-1 and 108-2 operate in the same manner as previously referenced embodiment of fully cased downhole well loop 108, however, after leaving the respective outlets 128A-1 and 128A-2 of production wells 128-1 and 128-2, the two streams of gaseous working fluid 208 may be merged into a single stream to be received by a single turbine system 132. As such, merging connecting piece 168-1 may be configured to allow for said merging of two streams of gaseous working fluid 208. Furthermore, a single cooler 136 may receive the gaseous working fluid 208 exiting turbine system 132 to condense the gaseous working fluid 208 into liquid working fluid 204. The liquid working fluid 204 may then be split into two streams using splitter connecting piece 176-1 to be received by pump 104-1 and pump 104-2, where pump 104-1 may increase the pressure of liquid working fluid 204 to be injected into injection well 112-1 and pump 104-2 may increase the pressure of liquid working fluid 204 to be injected into injection well 112-2.

In using embodiment 100-1, the amount of components or equipment required may be minimized as turbine system 132 and cooler 136 may be shared across fully cased downhole loops 108-1 and 108-2. This leads to further minimizing cost. Furthermore, the footprint and above ground surface area is minimized as there is only a single turbine system 132 and cooler 136 above ground, as opposed to a turbine system 132 and a cooler 136 for each fully cased downhole well loop 108-1 and 108-2. In addition, scalability and economies of scale are inherent in the design of embodiment 100-1 as will be discussed below.

A person skilled in the art will recognize the modularity of turbine system 132, cooler 136 and pump 104. Specifically, a person skilled in the art will recognize that any number of fully cased downhole well loops 108 may be connected to a single turbine system 132, a single cooler 136 and a single pump 104. Alternatively, any number of fully cased downhole well loops may be connected to multiple turbine systems 132, a single cooler 136, and a single pump 104. Likewise, any number of fully cased downhole well loops may be connected to a single turbine system 132, multiple coolers 136 and a single pump 104. Or as can be seen from embodiment 100-1, multiple pumps 104 may be used. As such, a person skilled in the art will recognize the different combinations and variations of fully cased downhole well loops 108, turbine systems 132, coolers 136 and pumps 104.

During commercial operation when numerous well loops are producing and selling power through a sales meter into an electrical power transmission line there is desire to control power generated. For example, where 25 MW needs to be delivered to an electrical grid, twenty-five (25) fully cased downhole well loops 108 may be used. An on/off power control scheme is used to export the optimal amount of power into the electrical grid on an hourly basis. The system may electronically monitor grid capacity and power demand then provide feedback to the facility process logic controller (PLC). In an embodiment where there is a single turbine system 132 connected to the twenty-five (25) fully cased downhole well loops 108, the PLC will then automatically turn off pumps 104 and other rotating equipment and close electronically actuated well head valves to quickly "turn off" individual geothermal well loops. This on/off control system allows the facility to change power output between 0 MW to 25 MW in 1 MW increments. Alternatively, in an embodiment where there are twenty-five (25) turbine systems 132 connected to twenty-five (25) fully cased downhole well loops 108, the PLC may then turn off pumps 104 for each fully cased downhole well loops 108 and turn off turbine systems 132, allowing for the facility to provide power output between 0 MW to 25 MW in 1 MW increments.

This control scheme can also be used on a predetermined schedule. The advantages of the on/off control system is that is relatively simple to design and operate and provides good power output control. This control scheme can be used because the single closed loop system as shown in FIG. 6B where the working fluid only interacts with the underground reservoir through conduction. No reservoir fluids enter the geothermal loop and no well working fluid 200 enters the reservoir. All well heating occurs through conductive heat transfer. For this reason, power production can be rapidly changed by isolating working fluid 200 flow rate into the injection wells 112 which halts that well's electric power generation. Also, when a well is turned off it allows the underground rock to "recharge" through conductive heating and the fully cased downhole well loop 108 will be able to produce increased power (compared to steady state operation) when it is turned back on. A person skilled in the art will recognize the ability of the control scheme described above to control any number of fully cased downhole loops 108 and turbine systems 132.

Figure 15:
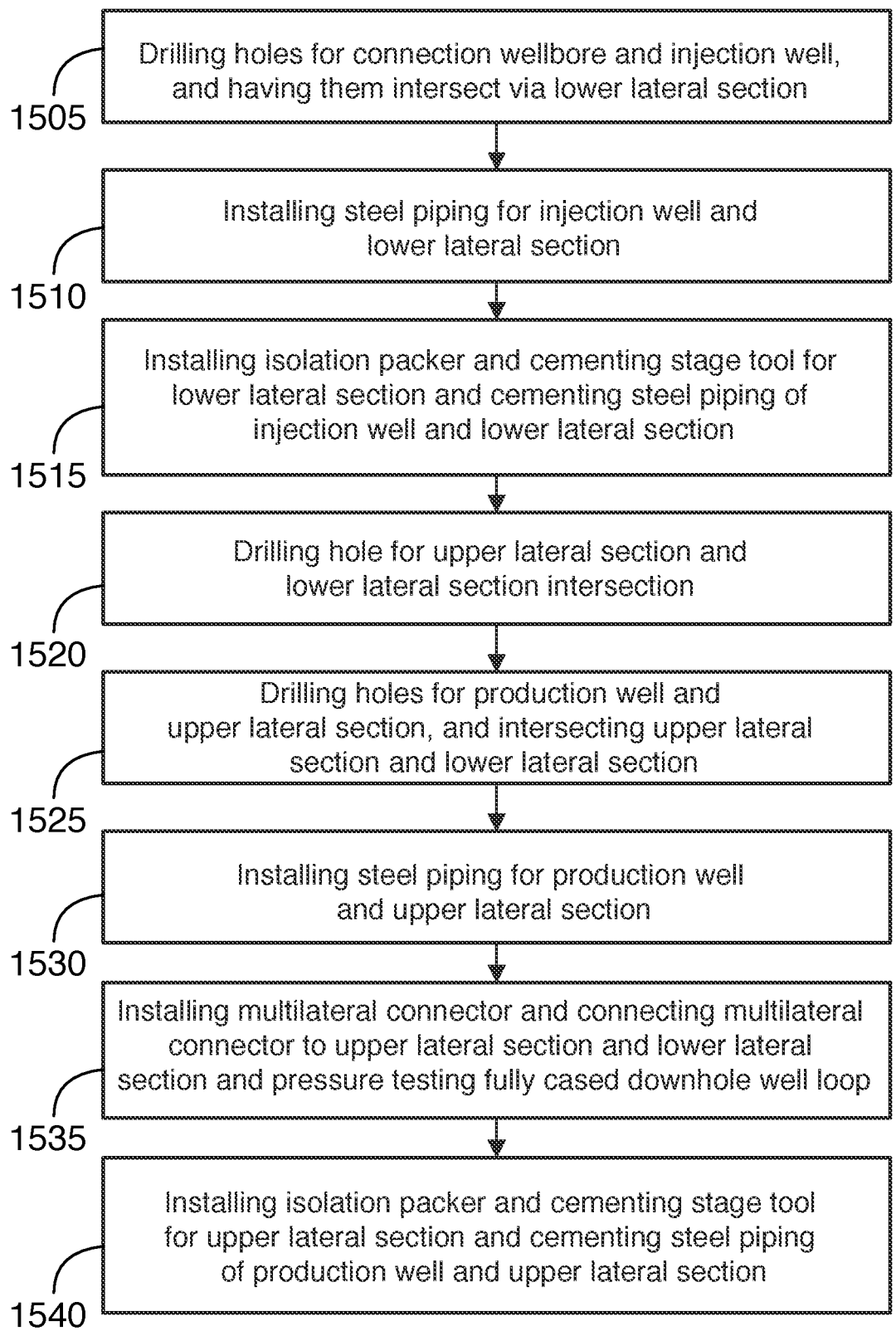
FIG. 15 is a flow chart setting out the steps of a method of constructing the system for generating energy from geothermal sources shown in FIG. 1 in accordance with an embodiment of the invention.

Referring to FIG. 15, there is shown a flowchart setting out the steps of a method 1500 of constructing the fully cased downhole well loop 108 of the geothermal energy generating system 100 in accordance with an embodiment of the invention. The construction of fully cased downhole well loop 108 uses drilling rigs to drill and connect two wellbores (the injection well 112 and production well 128), and a third wellbore, a connection wellbore 140, may be drilled and extended to provide a connection point for injection well 112 and production well 128.

Step 1505 includes drilling connection wellbore 140, injection well 112, and lower lateral section 116 extending between the connection wellbore 140 and injection well 112.

Two drilling rigs may be moved to and secured at separate surface locations. Referring to FIG. 7, this would be positions 304 and 308. Positions 304 and 308 are at a predetermined distance apart of at least the length of the lateral sections 116 and 124 (as depicted in FIG. 1) and at any offset distance required for the building angle in the well trajectory. It will be evident to a person skilled in the art that the positioning of the two drilling rigs in this case is based on the embodiment of fully cased downhole well loop 108 where the injection well 112, the production well 128, the lateral sections 116 and 124, and the multilateral connector 120 being along the same vertical plane, and that the positioning of the two drilling rigs may be adjusted based on the location and configuration of the components of fully cased downhole well loop 108. In addition, while in the current embodiment two drilling rigs are used, it will occur to a person skilled in the art that an additional third drilling rig may be used with changes to the sequence of events.

The first drilling rig located at position 304 above the planned connection wellbore 140 will drill a 440 mm (17¼") diameter hole to a depth of 650 m. The drilling mud/drilling fluid used may be an environmentally friendly freshwater gel system. Examples of the drilling mud include, but are not limited to, a bentonite clay as the gel, along with additives such as barium sulfate (Barite), calcium carbonate (chalk) or hematite. A person skilled in the art will recognize the different drilling muds that may be used in association with the drilling rigs. Surface casing 212 will be set in place with a diameter of 340 mm (13⅜") and will be run to a depth of 650 m. The full length and circumference of surface casing 212 will be cemented to surface 316. Surface casing 212 is important to ensure the securing of planned connection wellbore 140 in place, prevent shallow formations from sloughing into the wellbore, and to provide a base for the class 5 blowout preventer described below.

The second rig located at position 308 at planned injection well 112 will drill a 311 mm (12¼") diameter hole to a depth of 650 m. Similar to the drilling by the first rig located at position 304, the drilling mud of the second rig may be an environmentally friendly freshwater gel system. Surface casing 144 will be set in place with a diameter of 244 mm (9⅝") and will be run to a depth of 650 m. The full length and circumference of surface casing 144 will be cemented to the surface 316. Similar to surface casing 212, the purpose of surface casing 144 is to ensure the securing of planned injection well 112 in place, prevent shallow formations from sloughing into the wellbore, and to provide a base for the class 5 blowout preventer described below. In addition, surface casing 144 is to ensure no leakage of any working fluids 200 into the surrounding environment.

The cement casings used for both surface casing 144 and 212 will preferably have a total calculated hole volume plus 50% excess of thermal blend cement at 1860 kg/m$^3$ (approximately 80 t total mass of the cement). The cement casing may then undergo a first preflush of 2.5 m$^3$ fresh water. The cement casing may then undergo a second preflush of 5 m$^3$ viscosified water weighted to 1200 kg/m$^3$. An example of viscosified water includes Optiflush™. A person skilled in the art will recognize other forms or variations of viscosified water. The cement plug may then be dropped and displaced with fresh water.

Class 5 blowout preventers (not shown) may be installed in on or in proximity to surface casings 144 and 212. The class 5 blowout preventers are used to seal, control and monitor injection well 112 and connection wellbore 140 to prevent blowouts. In the current embodiment, the class 5 blowout preventers are pressure tested to a low pressure of 1,400 kPa and a high pressure of 35,000 kPA, where each pressure is tested over a duration of at least ten (10) minutes. Class 5 blowout preventers may also be pressure tested depending on formation pressures and any relevant regulatory requirements.

Drilling of holes for injection well 112 and connection wellbore 140 will be directionally controlled with a directionally controlled drilling assembly with measure while drilling ("MWD") surveys to maintain target accuracy. Specifically, the first drilling rig at position 304 will drill a 311 mm (12¼") diameter intermediate hole (not shown), through surface casing, to a predetermined depth. Initially, the connection wellbore 140 will be drilled vertically, and then directionally drilled to achieve a 90-degree inclination at landing point 228 in proximity to lower end 216 of connection wellbore 140. This landing point 228 will be in the geothermal target formation, which is located at a depth with the targeted temperature. In the current embodiment, connection wellbore 140 is drilled with an oil-based mud system to minimize washout and protect wellbore integrity. However, the drilling mud system used may be dependent on the area and historical drilling problems of the area. A person skilled in the art will recognize the different potential drilling mud systems that may be used.

An intermediate thermal casing 236 with a diameter of 244 mm (9⅝") will be run the total depth of connection wellbore 140, and the intermediate thermal casing 236 may be cemented to the surfaces of the surrounding rock formations 320. The intermediate thermal casing 236 may then undergo a first preflush of 5 m$^3$ viscosified water, where the viscosified water is weighted to provide greater wellbore pressure/hydrostatic pressure than that of the formation pressure to maintain an overbalanced wellbore. The intermediate thermal casing 236 may then undergo a second preflush of 5 m³ scavenger weighted to 1450 kg/m³, or higher to maintain an overbalanced wellbore. An overbalanced wellbore will prevent the formation of gas or fluid from entering the wellbore and rising to the surface. The cement is then filled/provided into intermediate thermal casing 236 with a thermolite cement at total calculated hole volume plus 20% excess (approximately 75 t). The tail cement is then provided with a gastight cement at 20% (approximately 45 t). The inner diameter of the cement is then displaced with fresh water to create the hollow wellbore, leaving the outer diameter cemented to the rock formations 320.

The volumes and blends of the cement may be adjusted depending on historical well data, formation pressures and regional regulatory isolation requirements for certain formations to prevent crossflow contaminations.

Intermediate thermal casing 236 may be secured at wellhead/inlet 232 utilizing a speed head or an additional wellhead section to set slips. Slips (also referred to herein as anchors) may be set with intermediate thermal casing 236 in full tension to hold the intermediate thermal casing 236 inside surface casing 212. In certain embodiments, the class 5 blowout preventer on surface casing 212 may have to be disassembled for the installation of the slips. Once reassembled, the class 5 blowout preventer may be pressure tested again to the same pressures and specifications to confirm integrity of the class 5 blowout preventer after re-assembly, however with intermediate thermal casing 236 present in connecting well 140.

A gyroscopic wireline survey tool may be deployed in connecting wellbore 140. The gyroscopic wireline survey tool will allow continuous surveying from vertical to horizontal and point of refusal. The gyroscopic wireline survey tool provides well geometry with an extremely high level of accuracy, and gives exact coordinates of connecting wellbore 140 to assist in intersecting with injection well 112.

The first drilling rig will then drill a 222 mm (8¾") diameter main hole through intermediate thermal casing 236 to provide a 200 m diameter open hole. Similar to above, the drilling of the main hole by first drilling rig may use an oil-based mud system.

After the main hole has been drilled, the directionally controlled drilling assembly will be removed from the well. A magnetic tool will then be lowered into wellbore to the end of the 200 m open hole section. An example of the magnetic tool is the Lodestone™ provided by Scientific Drilling. The magnetic tool is an active ranging system built for intentional wellbore intersections. It can be used in conjunction with all MWD systems. The sensor of the magnetic tool may be deployed in connection wellbore 140 and magnetic sub may be deployed on directionally controlled drilling assembly in injection well 112. The resulting magnetic field provides accurate ranging for the intersection along horizontal section 116 between the connection wellbore 140 side and the injection well 112 side.

The second rig will drill a 222 mm (8¾') main hole, through surface casing 144, to a predetermined depth. In a preferred embodiment, the predetermined depth is between 2300 m and 2500 m, however the depth may vary depending on the preferred temperature or geothermal target formation. Initially, the well may be drilled vertically, and then directionally drilled to achieve a 90-degree inclination at landing point 224, where landing point 224 is in proximity to the lower end 196 of injection well 112. The landing point 224 will be in the geothermal target formation. Similar to the first drill rig drilling the main hole of connection wellbore 140, the drilling of the main hole of injection well 112 may be drilled with an oil-based mud system. The drilling assembly may then be removed from well. The gyroscopic wireline survey tool may then be deployed in injection well 112 to provide the coordinates of injection well 112 to assist in intersection with connection well 140. A new directionally controlled drilling assembly, complete with magnetic tool (as previously described Lodestone™ package) will be lowered into wellbore.

To intersect between the two ends of lower lateral section 116, drilling will continue laterally from the injection well 112 and landing point 224 end of lower lateral section 116 in direction of connection wellbore 140. The magnetic tool and will facilitate the intersection of the two wellbores. Once the two ends of lower lateral section 116 have intersected at an intersection point 240, both directionally controlled drilling assemblies may be removed from their respective wellbores.

At step 1510 (shown in FIG. 15), production steel casing 156 is installed in injection well 112 and lower lateral section 116.

Figure 8:
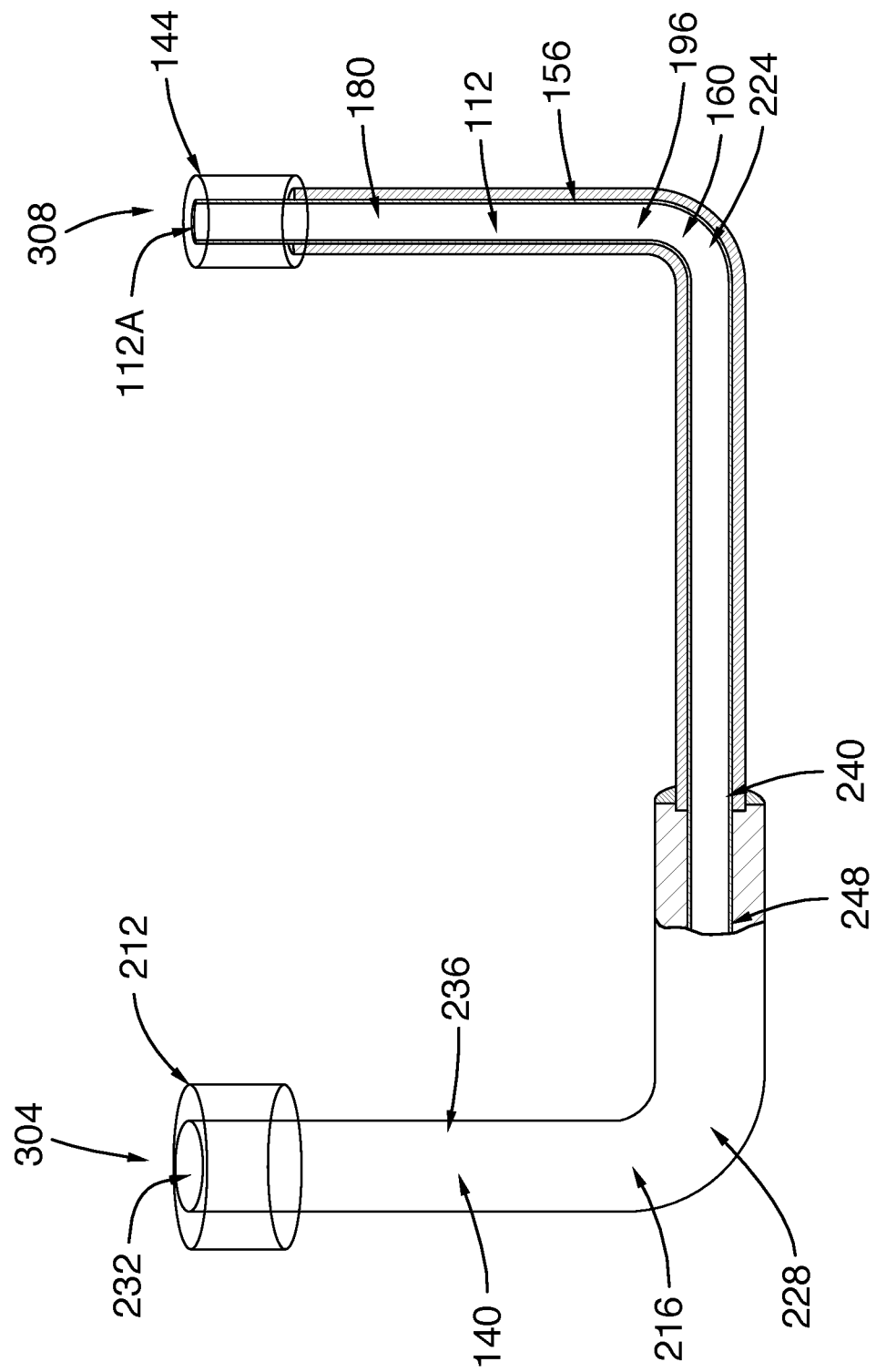
FIG. 8 is a schematic cross-sectional view depicting a second step of constructing the system for generating energy from geothermal sources shown in FIG. 1, showing the casing being installed along the injection well and through part of the first lateral connection section.

Referring to FIG. 8, production steel casing 156 with a diameter 139 mm (5½") may be installed along injection well 112 and along lower lateral section 116 from landing point 224 to the intersection point 240. Specifically, the production steel casing 156 may extend from the inlet 112A of the injection well 112 at the surface 316, to 50 m into the intermediate thermal casing 236 of connecting wellbore 140. The lowermost end section 248 of production steel casing 156 will have a connection/seal assembly (not shown) to be used to make a pressure tested connection with multilateral connector 120. In the current embodiment, the connection/seal assembly is a polished bore receptacle. The polished bore receptacle will be completed with a Baker centralized/reversed sealbore extension and anchor seal assembly latch profile (not shown).

Custom built steel centralizers (not shown) may also be attached to exterior of casing 156, prior to cementing. Centralizers are typically designed to lift casing 156 from the bottom of lower lateral section 116, thus allowing the cement to encircle casing 156 completely. The custom built elongated centralizers may also be used to provide increased conductivity (as they are made of steel) between formation heat and steel body of casing 156 directly through the cement 152. As previously stated, hematite additions may be also added to cement 152 to optimize conductivity.

At step 1515 (shown in FIG. 15), an isolation packer 252 and a cementing stage tool 256 are installed, and production steel casing 156 of injection well 112 and lower lateral section 116 are cemented in place.

Figure 9:
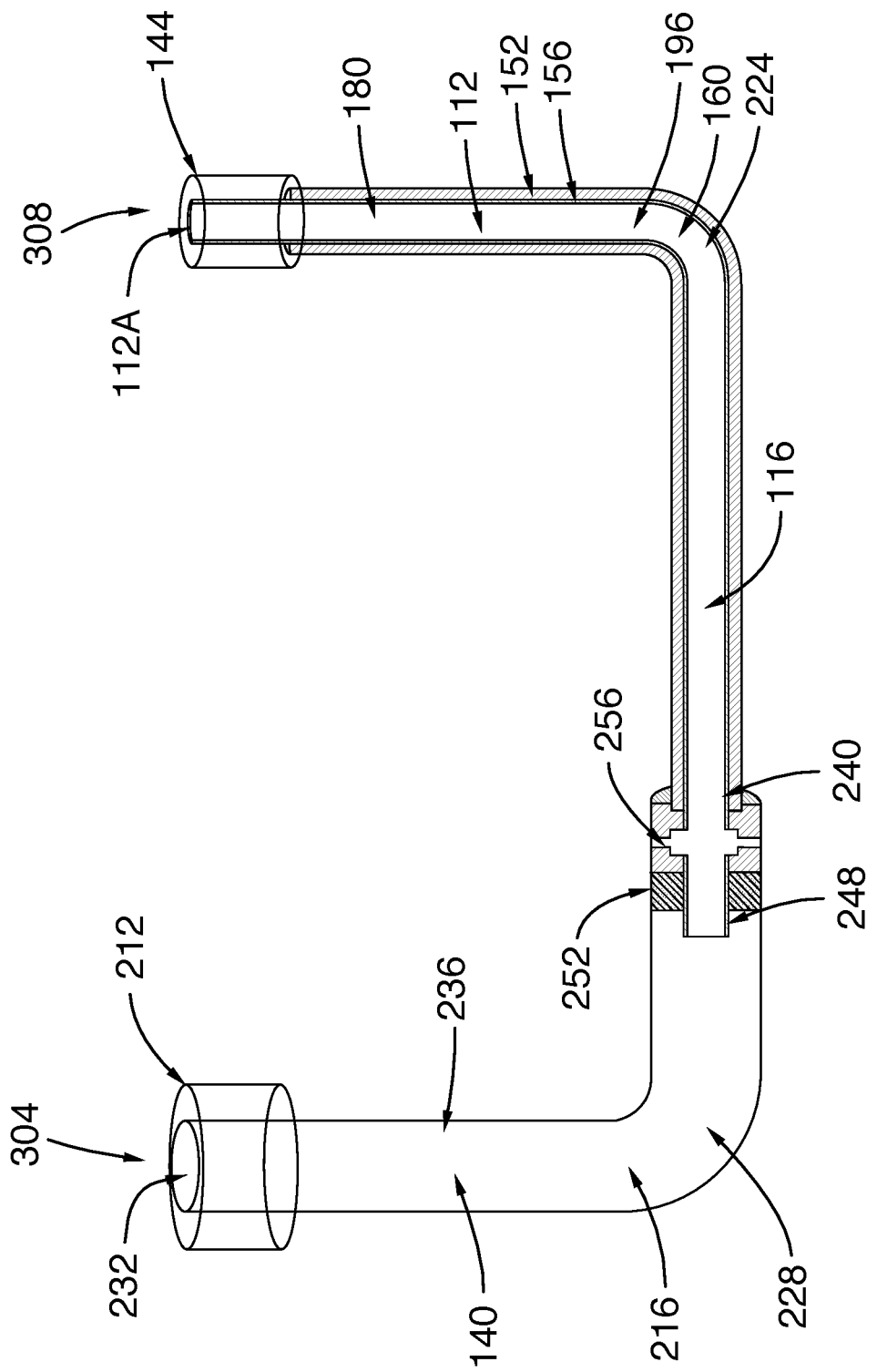
FIG. 9 is a schematic cross-sectional view depicting a third step of constructing the system for generating energy from geothermal sources shown in FIG. 1, showing an isolation packer and cementing stage tool being installed, and cement being poured between the casing and the walls of the injection well and part of the first lateral connection section.

Referring to FIG. 9, the isolation packer 252 is a rubber element, which can be expanded to create an impermeable seal between the outer diameter of the production steel casing 156 and the inner diameter of the intermediate thermal casing 236. This will prevent cement from entering remaining intermediate casing and causing a blockage in construction well 140. In a preferred embodiment, two isolation packers 252 may be used to increase the integrity of seal packers (not shown).

The cementing stage tool 256 will be opened (which also creates an inner diameter plug at the end of the production steel casing 156 to prevent cement from entering intermediate thermal casing 236 from connection well 140). The production steel casing 156 from injection well 112 may then be cemented to the surface of the surrounding rock formations 320.

Cementing production steel casing 156 includes first circulating injection well 112 clean of all drill cuttings. A first dart may then be dropped into injection well 112 from the surface to inflate the isolation packer 252 and to open cementing stage tool 256 to allow cement to be circulated around the outer diameter of production steel casing 156. Injection well 112 then undergoes a first preflush of 5 m³ viscosified water, where similar to previous flushings the viscosified water is weighted to maintain an overbalanced wellbore. Injection well 112 then undergoes a second preflush of 5 m³ scavenger, the scavenger weighted to 1450 kg/m³ to maintain the overbalance within injection well 112. The cement is then filled/provided into intermediate thermal casing 236 with a thermolite cement at total calculated hole volume plus 20% excess (approximately 62 t). The tail cement is then provided with a gastight cement at 20% excess (approximately 98 t). The cement is then displaced with fresh water. A person skilled in the art will recognize that similar to the abovementioned drilling procedures for connecting well 140, that volumes, blends and intervals of cement and preflushing may be adjusted based on historical data of the geographical locations and formations, formation pressures and regional regulatory isolation requirements for certain formations to prevent crossflow contaminations. A second dart is also dropped into the injection well 112 from the surface and will land in cementing stage tool 256 (which acts as a check valve), which will close cementing ports, effectively blocking cement from flowing back up injection well 112.

Production steel casing 156 will be set in tension with automatic slips in a casing bowl, where the casing bowl allows the production steel casing 156 to be bolted to the class 5 blowout preventer.

The second drilling rig will pick up milling assembly including the 114.3 mm (4½") bit, mud motor and 73 mm (2⅞") diameter drill pipe. Trip in hole and mill out cementing stage tool 256 and float equipment to allow the unrestricted flow of working fluid 200. Debris is also cleared from connecting wellbore 140, lower lateral section 116, connecting piece 160 and injection well 112 by circulating inhibited water returns down injection well 112, through connecting piece 160 and lower lateral section 116, and up connecting wellbore 140 to the surface 316.

At step 1520 (shown in FIG. 15), a two-part whipstock 260 is installed, the access hole to allow the intersection of planned production well 128 and upper lateral section 124 to lower lateral section 116 is drilled, and initial holes for production well 128 are drilled.

Figure 10:
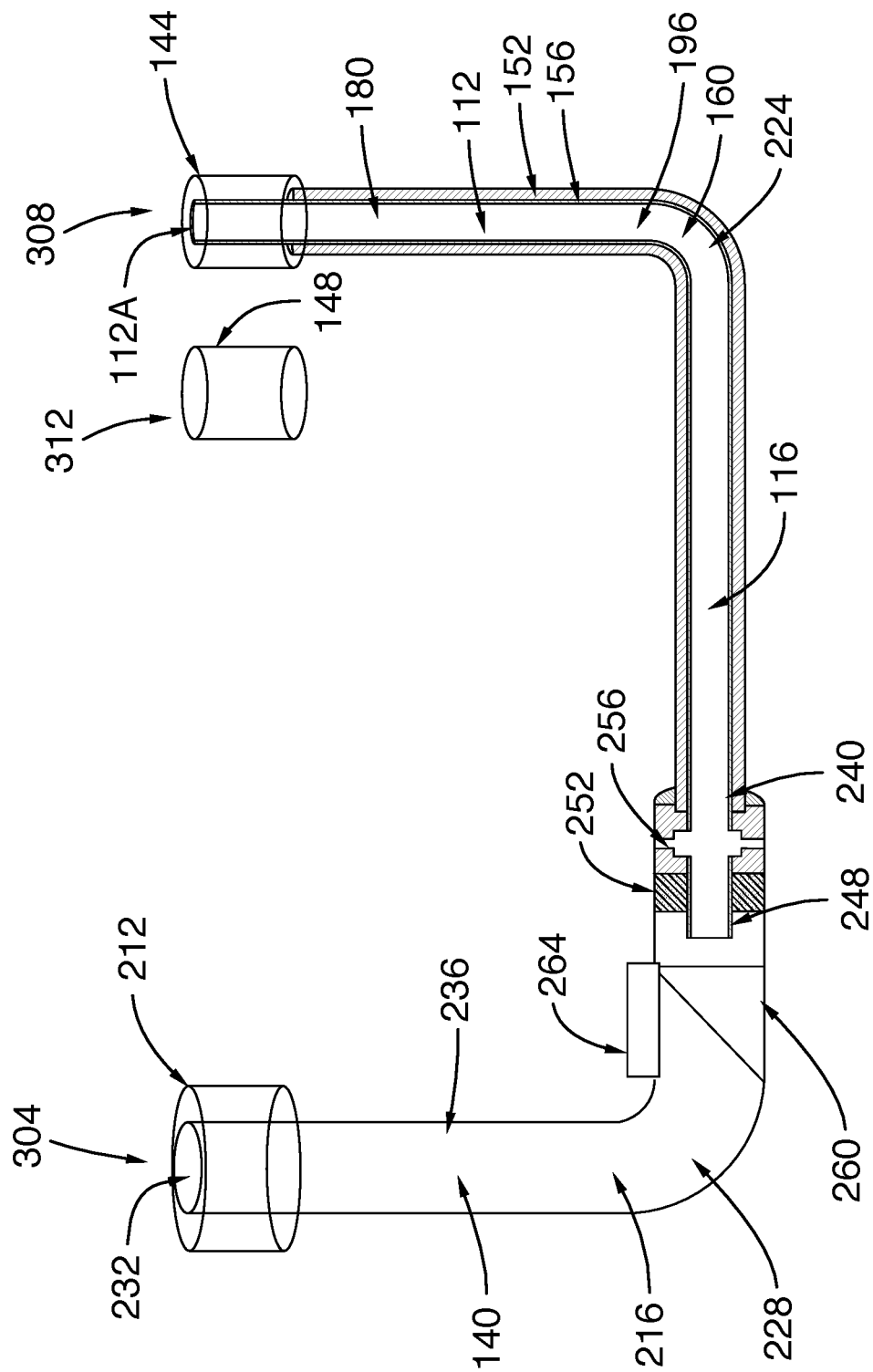
FIG. 10 is a schematic cross-sectional view depicting a fourth step of constructing the system for generating energy from geothermal sources shown in FIG. 1, showing a two-part whipstock being installed in proximity to the isolation packer, and the drilling of the wellbore hole for the production well.

Referring to FIG. 10, the two-part whipstock 260 (also referred to herein as whipstock 260) is installed within lower lateral section 116 in proximity to isolation packer 252, between the landing point 228 and the isolation packer 252. The whipstock 260 includes an upper section (spoon), which forces the pineapple mill (not shown) to cut a diamond shaped window 264 (also referred to herein as milled window 264 and bridging hole 264) through intermediate casing 236. Whipstock 260 also includes a lower section (not shown) which includes a guide and anchor (not shown) which may be set permanently in intermediate casing. The guide allows drilling and completion assemblies to be forced out through window, in addition to a 139.7 (5½") diameter hole through the center of the guide. This allows completion assemblies to be diverted through to lower section of wellbore A person skilled in the art will recognize the use of whipstocks and their uses in creating wellbore junctions.

Whipstock and milled window 264 will allow a second wellbore to be drilled in the geothermal target formation, from connecting wellbore 140.

The second drilling rig may then move to position 312 above planned production well 128. The second drilling rig will drill a 311 mm (12¼") diameter hole to a depth of 650 m. Similar to the initial holes for injection well 112 and connecting wellbore 140, drilling mud may be an environmentally friendly freshwater gel system. Surface casing 148 may be set in place with a diameter of 244 mm (9⅝") and will be run to a depth of 650 m and the full length of surface casing 148 may be cemented to the surface of surrounding rock formations 320.

The cement casing used in association with surface casing 148 will preferably have a volume plus 50% of thermal cement at 1860 kg/m3 (approx. 45 t). The cement casing may then undergo a first preflush of 2.5 m³ fresh water. The cement casing may then undergo a second preflush of 5 m³ viscosified water weighted to 1200 kg/m3. The cement plug may then be dropped and displaced with fresh water.

Similar to the setting in place of surface casing 144, class 5 blowout preventer may be installed on or in proximity to surface casing 148. Class 5 blowout preventer may then be pressure tested under the same conditions and with the same considerations as those of class 5 blowout preventers for injection inlet 112.

At step 1525 (shown in FIG. 15), production well 128 and upper lateral section 124 are drilled, and upper lateral section 124 and lower lateral section 116 are intersected.

Figure 11:
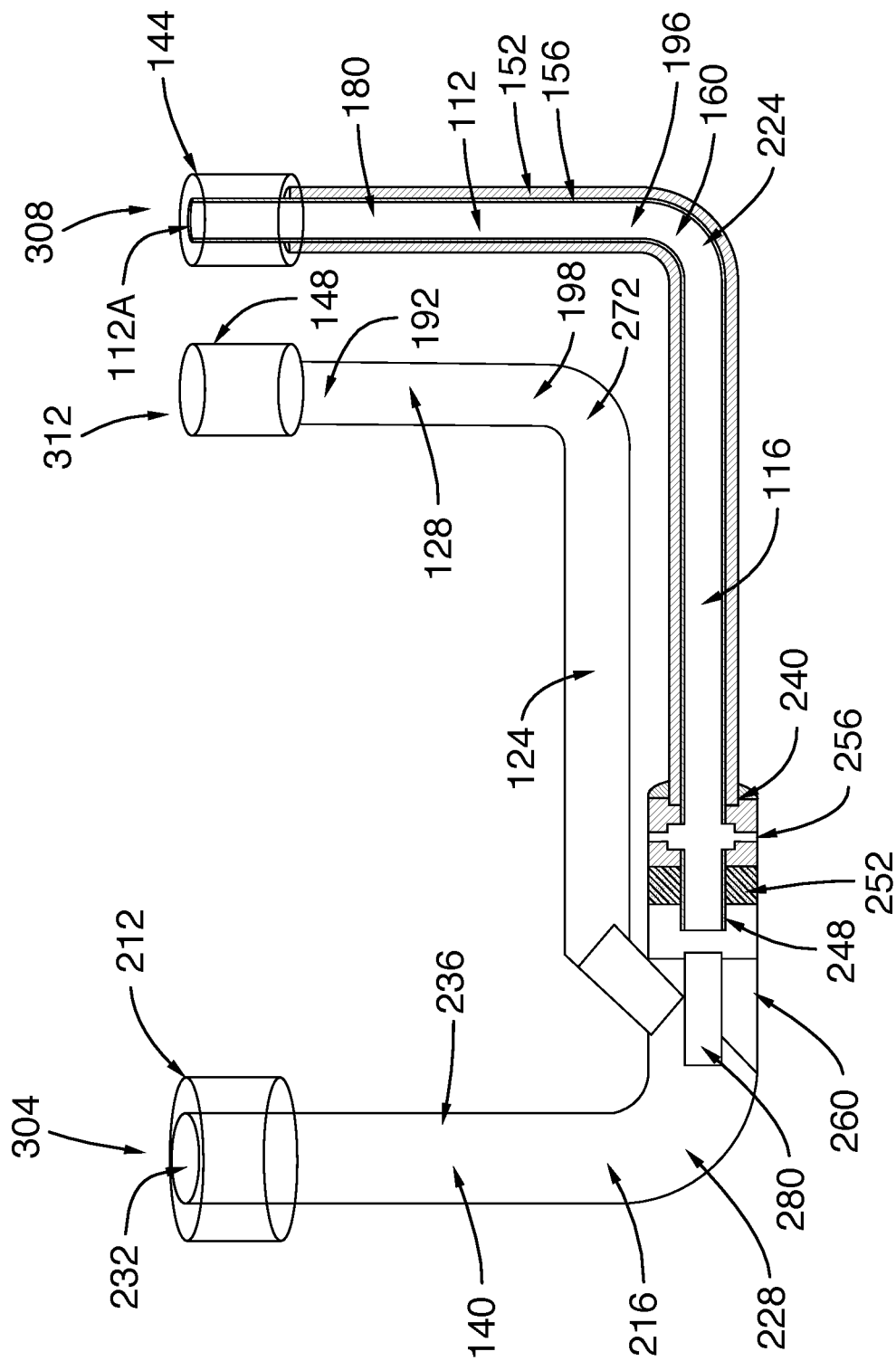
FIG. 11 is a schematic cross-sectional view depicting a fifth step of constructing the system for generating energy from geothermal sources shown in FIG. 1, showing the drilling of the production well, a second lateral connecting section, and an open hole of the casing window of the two-part whipstock.

Referring to FIG. 11, the first drilling rig may drill a 222 mm (8¾") diameter main hole, through intermediate thermal casing 236 to provide an additional 200 m of open hole. In the current embodiment, main hole may be drilled with an oil-based mud system. The directionally controlled drilling assembly may be removed from connection wellbore 140. The magnetic tool will then be lowered into connection wellbore 140 to the end of the 200 m open hole leading from connector piece 160. The magnetic tool may be deployed in connecting well 140 and the magnetic sub may be deployed on directional assembly in production well 128.

The second drilling rig will drill a 222 mm (8¾') diameter main hole, through surface casing 148, to a predetermined depth. Initially, the production well 128 will be drilled vertically, and then directionally drilled to achieve a 90-degree inclination at landing point 272. Landing point 272 will be in geothermal target formation. Similar to previous drilling procedures, production well 128 may be drilled with an oil-based mud system. The directionally controlled drilling assembly may be removed from production well 128 and the gyroscopic wireline survey tool may be deployed in production well 128. The gyroscopic wireline survey tool may provide coordinates of production well 128 to assist in the intersecting with connecting wellbore 140. A new drilling assembly, complete with magnetic tool may be lowered into production well 128. Drilling will continue in the direction of connecting wellbore 140. The magnetic tool and the magnetic sensor will facilitate the intersection of the two wellbores. Once connecting wellbore 140 and production well 128 have intersected, both directionally controlled drilling assemblies may be removed from wellbores.

The upper section of whipstock (spoon) is removed, leaving lower section of whipstock 260 inside intermediate thermal casing 236 of connecting wellbore 140. The lower whipstock section (guide and anchor) allows the multilateral connector 120 with a short section of casing or directionally controlled drilling assemblies to be diverted out the window into the open hole section connected to production well 128. Additionally, the guide has a 139 mm (5½") diameter hole through the center of whipstock 260. This allows the multilateral connector 120 with certain outer diameters to be lowered beneath the whipstock and connect with production casing on injection well 112. By adjusting outer diameters of the completion assemblies, the installer can ensure proper assemblies enter correct wellbore.

At step 1530 (shown in FIG. 15), the production steel casing 156 is installed in the production well 128 and the upper lateral section 124.

Figure 12:
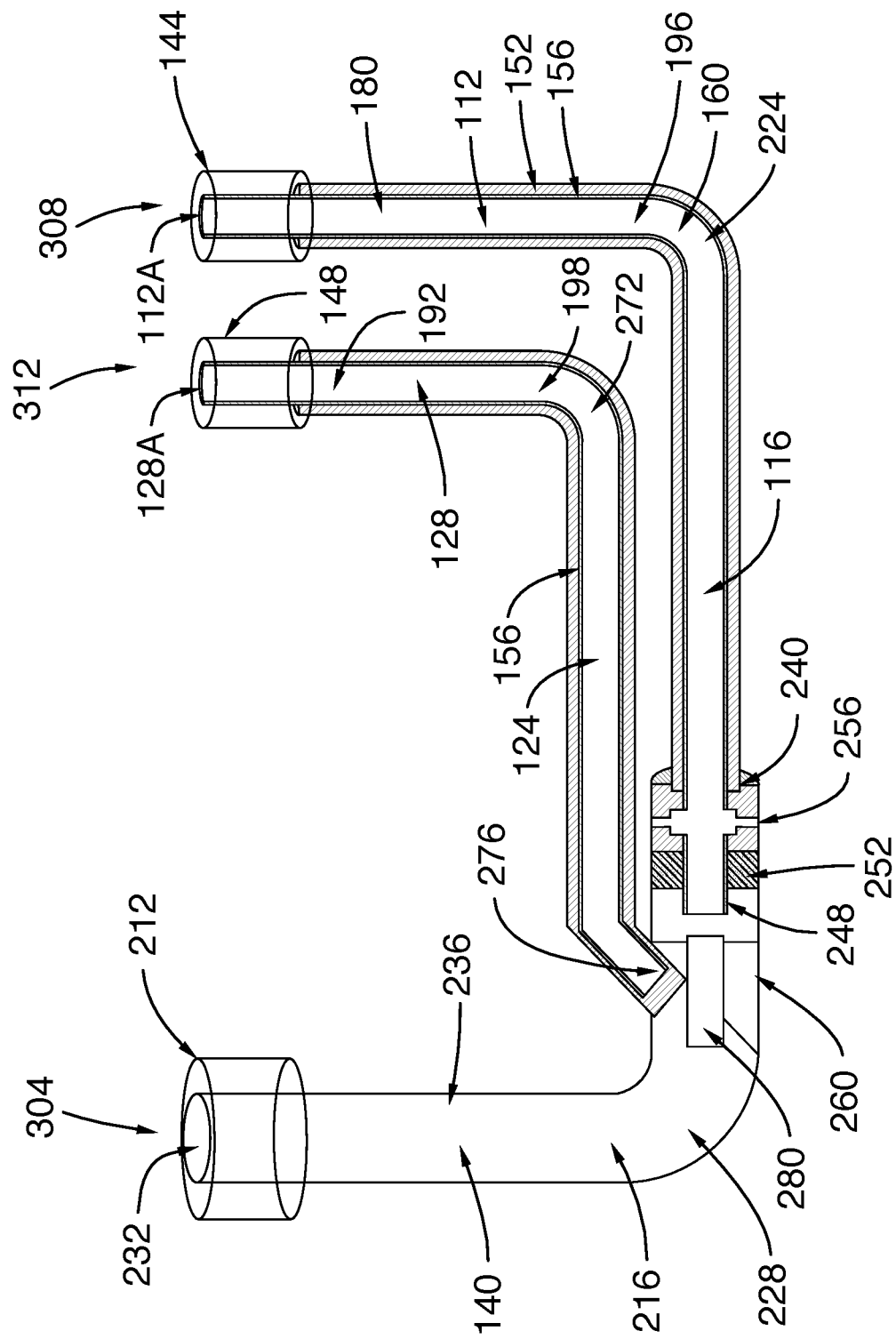
FIG. 12 is a schematic cross-sectional view depicting a sixth step of constructing the system for generating energy from geothermal sources shown in FIG. 1, showing the removal of the core of the two-part whipstock, leaving a window guide installed between the two lateral connecting sections, and the installation of the casing along the production well, second lateral connecting section and the open hole of the casing window of the two-part whipstock.

Referring to FIG. 12, production steel casing 156 with a 139 mm (5½") diameter will be installed in intersected wellbores from connecting wellbore 140. The production steel casing 156 may extend from production well 128 at the surface 316 at outlet 128A, to within approximately 20 m of the intermediate thermal casing window 264 in connecting wellbore 140. The lowermost end section 276 of production steel casing 156 may have a connection/seal assembly similar to that of lowermost end section 248, specifically in the current embodiment connection/seal assembly may be a polished bore receptacle with Baker centralized/reversed seal bore extension and anchor seal assembly latch profile.

At step 1535 (shown in FIG. 15), multilateral connector 120 is installed and connected between upper lateral section 124 and lower lateral section 116. Fully cased downhole well loop 108 is then pressure tested.

Figure 13:
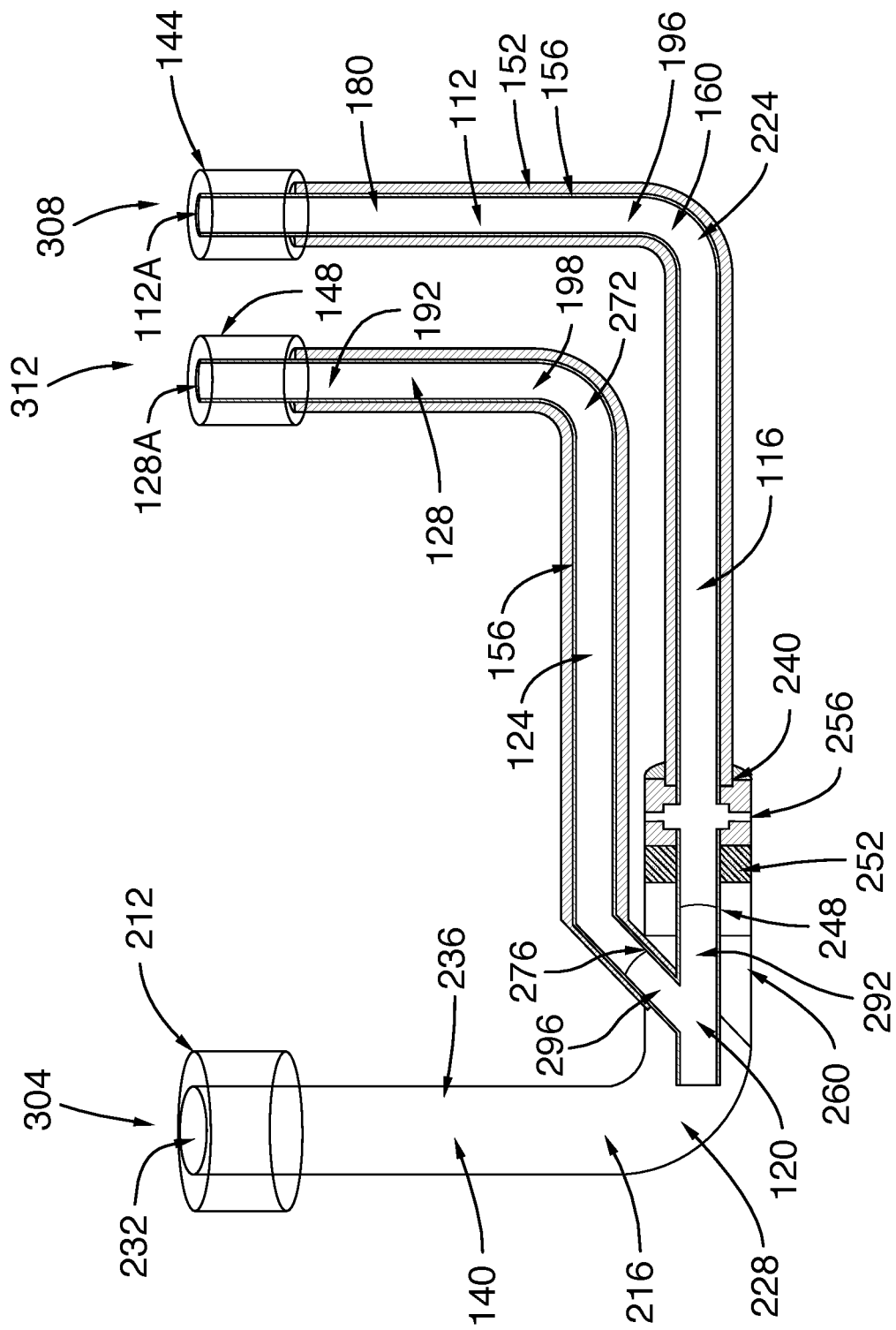
FIG. 13 is a schematic cross-sectional view depicting a seventh step of constructing the system for generating energy from geothermal sources shown in FIG. 1, showing the installation of a multilateral connector along the window guide between the two lateral connecting sections, and the connection of the injection well and the production well through the two lateral connecting sections and the multilateral connector.
Figure 14:
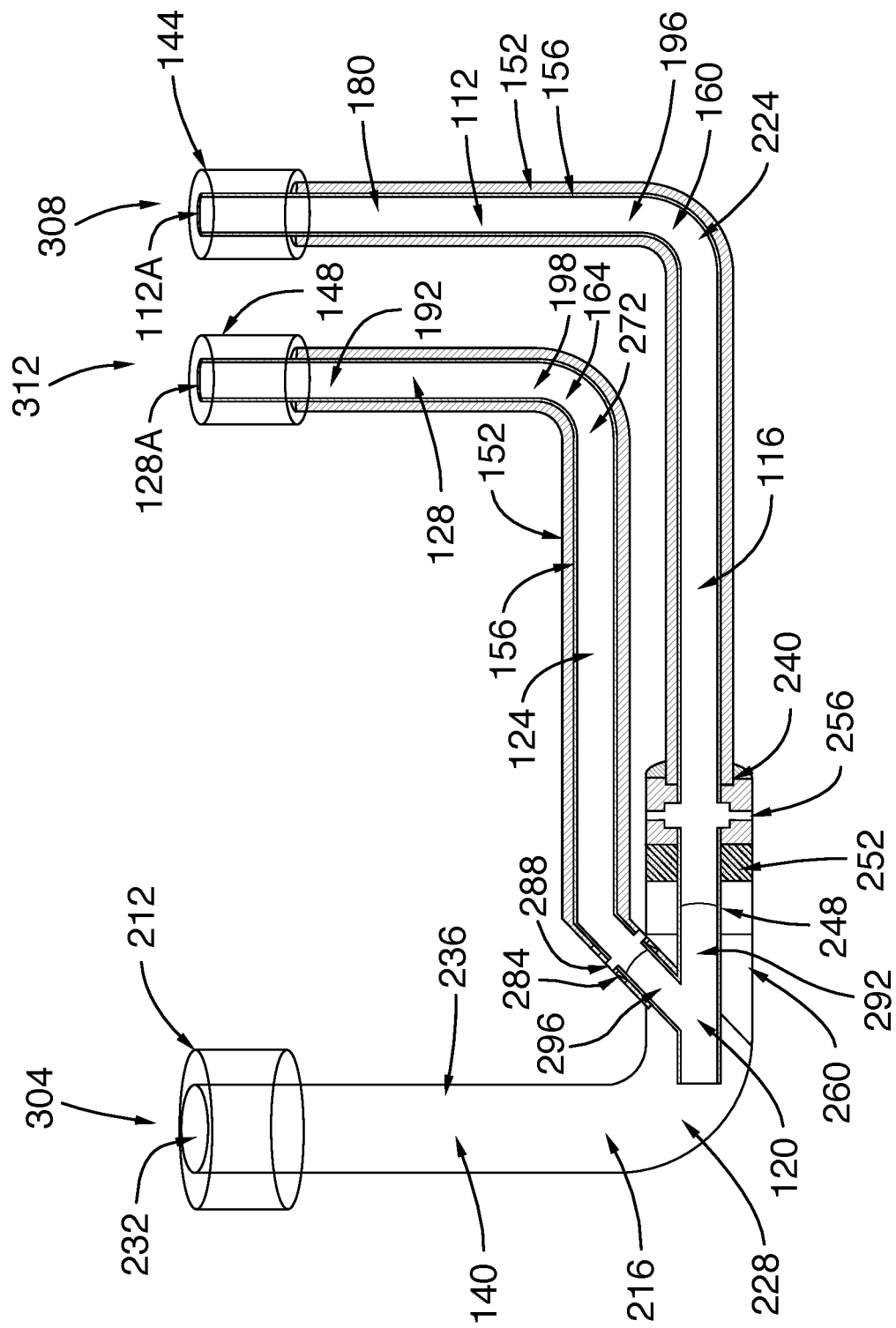
FIG. 14 is a schematic cross-sectional view depicting an eighth step of constructing the system for generating energy from geothermal sources shown in FIG. 1, showing the installation of an isolation packer and cementing stage tool along the open hole of the casing window of the two-part whipstock, and the pouring of cement between the casing and the walls of the production well, the second lateral connecting section and the open hole of the casing window of the two-part whipstock.

Referring to FIG. 13, two dummy trips into injection well 128 are conducted. The first trip is conducted with a polished bore locator seal assembly, where there is no latch, with an outer diameter greater than 139.7 mm (5½") to tag receptacle in production well 128 to verify exact depth for spacing. The second trip is conducted with a polished bore locator seal assembly, where there is no latch, with an outer diameter less than 139.7 mm (5½") to tag receptacle in injection well 112 to verify exact depth for spacing. This process allows for the exact depth measurements and distances between the access well 140, the injection well 112 and the production well 128. Multilateral connector 120 may then be constructed with appropriate spacing to connect injection well 112 and production well 128.

Multilateral connector 120 may be lowered into connecting well 140, (utilizing drill pipe for landing operation) to connect injection well 112 and production well 128. The multilateral connector 120 will be made up of two different "legs", with each leg designed to ensure and facilitate entry into a specific well (either injection well 112 or production well 128), and create a pressure tested connection with the production steel casing 156 in each of injection well 112 and production well 128. One leg 292 will include a polished bore locator seal assembly with centralized shear type protective shroud, with an outer diameter less than 139 mm. This will allow polished bore location seal assembly to be lowered through window guide and connect with polished bore receptacle of production steel casing on injection well 112. The second leg 296 of multilateral connector 120 is of the same design except the outer diameter will be greater than 139 mm, forcing the polished bore locator seal assembly with centralized shear type protective shroud out the milled window and connecting it with production steel casing 156 via polished bore receptacle on production well 128. The second leg 296 may also include a pin/shear activated sleeve to protect seals from friction damage through window 280 and open hole section.

The multilateral connector 120 offers full mechanical and hydraulic isolation support of the junction area with re-entry capabilities. The multilateral connector 120 is designed to accommodate re-entry tie-ins on steam-assisted gravity drainage applications. It is typically run with a full-length liner on one attachment, with the second attachment providing a pressure tested seal with existing lateral. The multilateral connector 120 serves to provide the junction point of injection well 112 and production well 128 utilizing the connecting wellbore 140 as the entry point.

Connecting wellbore 140 may be used for the construction of multiple pairs of injection wells 112 and production wells 128. By adjusting lateral length of lateral section of connecting wellbore 140, multiple junctions and "sets" of geothermal wells could be added to system.

Once connection of multilateral connector 120 to injection well 112 and production well 128 is complete, circulation can be established from production well 128, through production steel casing 156, and through drill pipe to the surface 316 on connecting wellbore 140. A valve can be closed at the surface 316 of connecting wellbore 140, and entire assembly and sealed connections on injection well 112 and production well 128 can be pressure tested. Production well 128 may be initially circulated to clean production well 128 and injection well 112 of any remaining cuttings.

With the circulation able to be established, a pressure test (known to those skilled in the art) may be performed on the entire fully cased downhole well loop 108.

At step 1540 (shown in FIG. 15), an isolation packer 284 and a cementing stage tool 288 are installed, and production steel casing 156 of production well 128 and upper lateral section 124 are cemented in place.

Referring to FIG. 13, upon completion of successful circulation and passing of pressure tests, the cementing stage tool 288 may be opened. Cementing stage tool 288 also creates an inner diameter plug at the end of production steel casing to prevent cement from entering intermediate thermal casing 236 from connecting wellbore 140 and injection well 112. The production steel casing 156 from production well 128 will be full length cemented to the surface of the surrounding rock formations 320 at production well 128. This includes entire open hole section and inner diameter of surface casing on production well 128.

Cementing production steel casing 156 follows the same procedure as is described above, including dropping a first dart to inflate isolation packer 284 and open cement staging tool 288, pre-flushing the production steel casing 156 first with viscosified water, and then with scavenger, filling with thermolite cement, providing tail cement, displacing the cement with fresh water, and then dropping the second dart. The production steel casing 156 will be set in tension with automatic slips in the casing bowl.

The second drilling rig will pick up milling assembly consisting of a 114.3 mm (4½") bit, mud motor and 73 mm (2⅞") diameter drill pipe. Subsequently, trip in hole and mill out cementing stage tool 288 and float equipment. In addition, all debris is cleared from the wellbore, by initially circulating returns to production well 128 and a final circulation up production steel casing 156 of injection well 112.

In the alternative, cementing stage tools 256 and 288 may be milled out in injection well 112 and production well 128 along with multilateral connector 120 connections to lateral sections 116 and 124 after cementing. This can be completed with a drilling rig and a jointed drill pipe, or a coiled tubing unit. In both cases, a 114 mm (4½") drill bit may be used to mill out cementing stage tools 256 and 288 and verify the full gauge inner diameter of production steel casing 156. Additionally, mill outs would clean production steel casing 156 inner diameter of any debris and excess cement. Coil tubing could also be used to mill out both production well 128 and injection well 112.

A wireline retrievable isolation plug may be installed in connecting wellbore 140 inside intermediate thermal casing 236, above multilateral connector 120. A positive and negative pressure test may then be conducted.

Once testing has been successfully performed, the geothermal energy generating system 100 is ready to be operated in accordance with the method steps set out in FIGS. 4 and 5.

The construction of the geothermal energy generating system 100 leverages known technologies and methods in wellbore construction in the field of oil and gas, but applies said technologies and methods in a novel and inventive manner for the generation and production of energy from geothermal sources.

Although the foregoing description and accompanying drawings to specific preferred embodiments of the present invention as presently contemplated by the inventor, it will be understood that various changes, modifications and adaptations, may be made without departing from the spirit of the invention.

The invention claimed is:

1. A system for generating energy from geothermal sources, the system comprising:
    an injection well extending underground into a rock formation, the injection well having an upper end and a lower end;
    a production well extending underground into the rock formation in proximity to the injection well, the production well having an upper end and lower end;
    a first lateral section connected to and extending away from a location along the injection well;
    a second lateral section connected to and extending away from a location along the production well; and
    the first and second lateral sections connected with a multilateral connector, each of the first and second lateral sections having a length that is greater than the distance between the upper ends of the injection well and the production well;
    each of the injection well, the production well, the first and second lateral sections being cased in steel and cemented in place within the rock formation;
    the injection well, the first lateral section, the multilateral connector, the second lateral section and the production well cooperating with each other to define a pressure-tested downhole well loop within the rock formation and in a heat transfer arrangement therewith, the pressure-tested downhole well loop being configured to receive a working fluid capable of undergoing phase change between liquid and gas within the pressure-tested downhole well loop as a result of heat transferred from the rock formation;
    a pump fluidly connected to the injection well, the pump being configured to circulate the working fluid through the pressure-tested downhole well loop;
    a turbine system fluidly connected to the production well, the turbine system being operable to convert mechanical energy generated from the flow of working fluid, into electricity;
    a cooler fluidly connected between the pump and the turbine system for cooling the working fluid; and
    an injection well surface casing surrounding an inlet of the injection well, the injection well surface casing extending partially above the injection well surface and configured to prevent the escape of the working fluid into the rock formation.

2. The system of claim 1 further comprising a production well surface casing surrounding an outlet of the production well, the production well surface casing extending partially above the production well surface and configured to prevent the escape of the working fluid into the rock formation.

3. The system of claim 1, wherein the injection well includes an inlet, and the production well includes an outlet, the inlet and the outlet being located on the surface in proximity to each other, the inlet being at a distance between 7 m and 50 m from the outlet.

4. The system of claim 1, wherein the system has an above ground surface area of 22500 m$^2$.

5. The system of claim 1, wherein the working fluid is a homogeneous working fluid.

6. The system of claim 1, wherein the working fluid is a heterogenous working fluid.

7. The system of claim 1, wherein the injection well has a depth of between 1000 m and 4000 m.

8. The system of claim 1, wherein the first lateral section has a length of between 2000 m to 4000 m.

9. The system of claim 1, wherein the second lateral section has a length of between 2000 m to 4000 m.

10. The system of claim 1, wherein the production well has a depth of between 1000 m to 4000 m.

11. The system of claim 1, wherein the first lateral section is longer than the second lateral section, and wherein the first lateral section is at a lower depth than that of the second lateral section.

12. The system of claim 1, wherein the first lateral section is a the same depth as the second lateral section, the first lateral section extending away from the lower end of the injection well at a first angle, and the second lateral section extending away from the lower end of the production well at a second angle.

13. The system of claim 1, wherein in operation the pressure-tested downhole well loop being configured to receive fluids pressurized between 7 MPa and 31 MPa.

14. The system of claim 1, wherein the pressure-tested downhole well loop is capable to withstand pressures of at least 7 MPa.

15. The system of claim 1, wherein the pump is a positive displacement type pump with a variable speed drive controller.

16. The system of claim 15, wherein the positive displacement type pump is selected from the group consisting of plunger type pumps, gear type pumps and rotary vane type pumps.

17. The system of claim 1, wherein the turbine system includes a turbine expander.

18. The system of claim 1, wherein the turbine system is capable of generating between 0.5 to 2 MW of output power.

19. The system of claim 1, wherein the cooler is using ambient air as a coolant.

20. The system of claim 1 further comprising a storage tank, the storage tank connected between the cooler and the pump, and being configured to hold the excess working fluid.

21. The system of claim 1, wherein the working fluid is selected from the group consisting of a refrigerant, a hydrocarbon-based fluid, ammonia, carbon dioxide, and water.

22. The system of claim 21, wherein the hydrocarbon-based working fluid is selected from the group consisting of propane, ethane, pentane, butane, and hydrocarbon blend.

23. The system of claim 1, wherein the working fluid is propane.

24. The system of claim 1 further comprising a recuperator with a first flow through connected between the turbine system and the cooler, and a second flow through connected between the pump and the injection well, the recuperator being configured to transfer heat from the first flow through to the second flow through.

25. The system of claim 1 further comprising an access well having a lateral segment, wherein the multilateral connector is positioned within the lateral segment of the access well.

26. The system of claim 25 further comprising:
wherein the injection well is a first injection well, the production well is a first production well, the multilateral connector is a first multilateral connector, the pressure-tested downhole well loop is a first pressure-tested downhole well loop and the pump is a first pump;
a second injection well extending underground into the rock formation, the second injection well having an upper end and a lower end;
a second production well extending underground into the rock formation in proximity to the second injection well, the second production well having an upper end and lower end;
a third lateral section connected to and extending away from a location along the second injection well;
a fourth lateral section connected to and extending away from a location along the second production well; and
the third and fourth lateral sections connected with a second multilateral connector, each of the third and fourth lateral sections having a length that is greater than the distance between the upper ends of the second injection well and the second production well;
each of the second injection well, the second production well, the third and fourth lateral sections being cased in steel and cemented in place within the rock formation;
the second injection well, the third lateral section, the second multilateral connector, the fourth lateral section and the second production well cooperating with each other to define a second pressure-tested downhole well loop within the rock formation and in a heat transfer arrangement therewith, the second pressure-tested downhole well loop being configured to receive the working fluid capable of undergoing phase change between liquid and gas within the second pressure-tested downhole well loop as a result of heat transferred from the rock formation;
a second pump fluidly connected to the second injection well, the second pump being configured to circulate the working fluid through the second pressure-tested downhole well loop;
the second production well fluidly connected to the turbine system, the turbine system being configured to receive the working fluid from the first production well of the first pressure-tested downhole well loop and the second production well of the second pressure-tested downhole well loop;
the cooler fluidly connected to both the first pump connected to the first injection well, and the second pump connected to the second injection well; and
the second multilateral connector of the second pressure-tested downhole well loop being positioned within the lateral segment of the access well at a location spaced apart from the first multilateral connector.

27. The system of claim 26, wherein the first injection well includes a first inlet, the first production well includes a first outlet, the second injection well includes a second inlet, and the second production well includes a second outlet, the second inlet and the second outlet being located on the surface in proximity to each other, the second inlet being at a distance between 7 m and 50 m from the second outlet.

28. The system of claim 27, wherein the first inlet and the second inlet being located on the surface in proximity to each other, the first inlet being at least a distance of 20 m from the second inlet.

29. The system of claim 27, wherein the first outlet and the second outlet being located on the surface in proximity to each other, the first outlet being at least a distance of 20 m from the second outlet.

30. The system of claim 27, wherein the system has an above ground surface area of 45000 m$^2$.

31. A method of generating energy from geothermal sources comprising:
providing a pressure-tested downhole well loop extending underground into a rock formation, the pressure-tested downhole well loop including:
an injection well, a production well in proximity to the injection well, a first lateral section connected to the injection well, a second lateral section connected to the production well,
a multilateral connector connecting the first lateral section and the second lateral section;
each of the injection well, the production well, the first and second lateral sections being cased in steel and cemented in place within the rock formation, the first and second lateral sections having a length that is greater than the distance on the surface between the injection well and the production well;
conveying a working fluid through the pressure-tested downhole well loop, the working fluid being received by the injection well in a liquid state;
while conveying the working fluid through the pressure-tested downhole well loop, transferring heat from the surrounding rock formations to the liquid working fluid and exerting pressure on the liquid working fluid;
inducing a phase change in the working fluid from a liquid state to a gaseous state, the working fluid exiting the production well in a gaseous state;
converting the mechanical energy generated from the flow of the gaseous working fluid, into electricity;
cooling the working fluid and inducing a phase change in the working fluid to a liquid state;
returning the working fluid to the injection well; and
providing an injection well surface casing surrounding an inlet of the injection well, the injection well surface casing extending partially above the injection well surface and configured to prevent the escape of the working fluid into the rock formation.

32. The method of claim 31, wherein conveying the working fluid through the pressure-tested downhole well loop includes pumping the working fluid.

33. The method of claim 31, wherein exerting pressure on the liquid working fluid includes exerting between 7 MPa and 31 MPa on the liquid working fluid.

34. The method of claim 31, wherein the step of converting the mechanical energy generated from the flow of the gaseous working fluid into electricity generates between 0.5 to 2 MW of output power.

35. The method of claim 31, wherein the step of cooling the working fluid and inducing a phase change in the working fluid is cooled using a cooler.

36. The method of claim 31 further comprising storing excess working fluid in a storage tank.

37. The method of claim 31, wherein the working fluid is a homogenous working fluid.

38. The method of claim 31, wherein the working fluid is a heterogenous working fluid.

39. The method of claim 31, wherein the working fluid is selected from the group consisting of a refrigerant, a hydrocarbon-based fluid, ammonia, carbon dioxide, and water.

40. The method of claim 39, wherein the hydrocarbon-based working fluid is selected from the group consisting of propane, ethane, pentane, butane, and hydrocarbon blend.

41. The method of claim 31, wherein the working fluid is propane.

42. The method of claim 41, wherein the propane being received by the injection well having a temperature of between 10° C. and 40° C. and a pressure of between 1000 kPag and 2000 kPag.

43. The method of claim 42, wherein the propane being received by the injection well having a temperature of 20° C. and a pressure of 1300 kPag.

44. The method of claim 41, wherein inducing a phase change in the propane from a liquid state to a gaseous state occurs when the propane reaches a temperature of 140° C. and a pressure of 6250 kPag.

45. The method of claim 44, wherein inducing a phase change in the propane from a liquid state to a gaseous state occurs in one of the second lateral section and the production well.

46. The method of claim 41, wherein the propane exiting the production well in a gaseous state having a temperature of between 90° C. and 110° C. and a pressure of between 3000 kPag and 4000 kPag.

47. The method of claim 46, wherein the propane exiting the production well in a gaseous state having a temperature of 106° C. and a pressure of 3500 kPag.

48. The method of claim 41, wherein while conveying the working fluid through the pressure-tested downhole well loop, the temperature of the propane increases by 76° C. and the pressure of the propane increases by 2170 kPag.

49. The method of claim 41, wherein after converting the mechanical energy generated from the flow of the gaseous working fluid into electricity, the propane having a temperature of between 16° C. and 63° C. and a pressure of between 700 kPag and 1500 kPag.

50. The method of claim 41, wherein cooling the working fluid cools the propane to a temperature of 30° C. and a pressure of 1080 kPag.

51. The method of claim 41 further comprising transferring heat from the working fluid in a first region to the working fluid in a second region using a recuperator, the working fluid in the first region occurring between the steps of converting the mechanical energy generated from the flow of the gaseous working fluid and cooling the working fluid, the working fluid in the second region occurring between the steps of conveying the working fluid through the pressure-tested downhole well loop and the working fluid being received by the injection well in the liquid state.

52. A system for generating energy from geothermal sources, the system comprising:
a first injection well and a second injection well extending underground into a rock formation, each of the first and second injection well having an upper end and a lower end;
a first production well and a second production well extending underground into the rock formation, each of the first and second production well in proximity to both the first and second injection well, each of the first and second production well having an upper end and lower end;
a first lateral section connected to and extending away from a location along the first injection well;
a second lateral section connected to and extending away from a location along the first production well;
a third lateral section connected and extending away from a location along the second injection well;
a fourth lateral section connected to and extending away from a location along the second production well;
the first and second lateral sections connected with a first multilateral connector, each of the first and second lateral sections having a length that is greater than the distance between the upper ends of the first injection well and the first production well;
the third and fourth lateral sections connected with a second multilateral connector, each of the third and fourth lateral sections having a length that is greater than the distance between the upper ends of the second injection well and the second production well;
each of the first and second injection wells, the first and second production wells, the first, second, third and fourth lateral sections being cased in steel and cemented in place within the rock formation;
the first injection well, the first lateral section, the first multilateral connector, the second lateral section and the first production well cooperating with each other to define a first pressure-tested downhole well loop within the rock formation, the second injection well, the third lateral section, the second multilateral connector, the fourth lateral section and the second production well cooperating with each other to define a second pressure-tested downhole well loop within the rock formation, being in a heat transfer arrangement with the rock formation each of the first and the second pressure-tested downhole well loop being configured to receive a working fluid capable of undergoing phase change between liquid and gas as a result of heat transferred from the rock formation;
a first pump fluidly connected to the first injection well, the first pump being configured to circulate the working fluid through the first pressure-tested downhole well loop;
a second pump fluidly connected to the second injection well, the second pump being configured to circulate the working fluid through the second pressure-tested downhole well loop;
a turbine system fluidly connected to the first and second production wells, the turbine system being operable to convert mechanical energy generated from the flow of working fluid, into electricity;
a cooler fluidly connected between the first and second pumps and the turbine system, the cooler being operable to cool the working fluid received from the turbine system and to provide the cooled working fluid to both the first and second pumps; and
the first and second pressure-tested downhole well loop located in proximity to each other.

53. A system for generating energy from geothermal sources, the system comprising:
an injection well extending underground into a rock formation, the injection well having an upper end and a lower end;
a production well extending underground into the rock formation in proximity to the injection well, the production well having an upper end and lower end;

a first lateral section connected to and extending away from a location along the injection well;

a second lateral section connected to and extending away from a location along the production well; and the first and second lateral sections connected with a multilateral connector, each of the injection well, the production well, the first and second lateral sections being cased in steel and cemented in place within the rock formation;

the injection well, the first lateral section, the multilateral connector, the second lateral section and the production well cooperating with each other to define a pressure-tested downhole well loop within the rock formation and in a heat transfer arrangement therewith, the pressure-tested downhole well loop being configured to withstand a pressure of at least 7 MPa and receive a working fluid capable of undergoing phase change between liquid and gas within the pressure-tested downhole well loop as a result of heat transferred from the rock formation;

a pump fluidly connected to the injection well, the pump being configured to circulate the working fluid through the pressure-tested downhole well loop;

a turbine system fluidly connected to the production well, the turbine system being operable to convert mechanical energy generated from the flow of working fluid, into electricity;

a cooler fluidly connected between the pump and the turbine system for cooling the working fluid; and an injection well surface casing surrounding an inlet of the injection well, the injection well surface casing extending partially above the injection well surface and configured to prevent the escape of the working fluid into the rock formation.

\* \* \* \* \*